US008964252B2

(12) United States Patent  
Fujimoto

(10) Patent No.: US 8,964,252 B2
(45) Date of Patent: Feb. 24, 2015

(54) DISPLAY INPUT DEVICE AND IMAGE FORMING APPARATUS HAVING TOUCH PANEL

(71) Applicant: KYOCERA Document Solutions Inc., Osaka (JP)

(72) Inventor: Norie Fujimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 13/848,685

(22) Filed: Mar. 21, 2013

(65) Prior Publication Data

US 2013/0265596 A1 Oct. 10, 2013

(30) Foreign Application Priority Data

Apr. 9, 2012 (JP) .................................. 2012-088295

(51) Int. Cl.
  *G06F 15/00* (2006.01)
  *G06F 3/0484* (2013.01)
  *G06F 3/0488* (2013.01)
  *G03G 15/00* (2006.01)
  *G06F 3/041* (2006.01)

(52) U.S. Cl.
  CPC .......... *G06F 3/04842* (2013.01); *G06F 3/0488* (2013.01); *G03G 15/502* (2013.01)
  USPC .............................. 358/1.9; 358/1.2; 345/173

(58) Field of Classification Search
  None
  See application file for complete search history.

(56) References Cited

U.S. PATENT DOCUMENTS

| 7,085,006 B2 * | 8/2006 | Yokoyama et al. ............ 358/1.9 |
| 8,842,084 B2 * | 9/2014 | Andersson et al. ........... 345/173 |
| 2004/0254465 A1 * | 12/2004 | Sano et al. .................... 600/443 |
| 2006/0066582 A1 | 3/2006 | Lyon et al. |
| 2006/0066588 A1 | 3/2006 | Lyon et al. |
| 2010/0235770 A1 * | 9/2010 | Ording et al. ................. 715/765 |
| 2011/0205171 A1 * | 8/2011 | Akiyoshi ....................... 345/173 |
| 2012/0306772 A1 * | 12/2012 | Tan et al. ...................... 345/173 |

FOREIGN PATENT DOCUMENTS

| JP | 2003177864 A | 6/2003 |
| JP | 2006338458 A | 12/2006 |
| JP | 2009523267 A | 6/2009 |
| JP | 2012505466 A | 3/2012 |
| WO | 2012043360 A1 | 4/2012 |

* cited by examiner

*Primary Examiner* — Steven Kau
(74) *Attorney, Agent, or Firm* — Alleman Hall McCoy Russell & Tuttle LLP

(57) ABSTRACT

A display input device includes a display portion and a touch panel portion. The display portion displays a screen and an image and displays an object which is an image to be cut or copied. The touch panel portion is provided for the display portion, accepts an input from a user, detects a plurality of positions that are touched, and accepts a first operation of narrowing the interval between two points touched at the same time. In addition, the touch panel portion accepts an input of designating, as a designated object, the object displayed at one or both of the positions of the two touched points, and accepts the first operation as an input of giving an instruction to cut or copy the designated object.

11 Claims, 13 Drawing Sheets

Fig. 8

```
                                                    11,12
74 ─┬─[icon] BOX SCREEN
    │ ┌──────┬──────────┬──────────┬────────┐
    │ │NUMBER│ BOX NAME │   USER   │  USED  │ ∧
    │ │      │          │          │ AMOUNT │
    │ ├──────┼──────────┼──────────┼────────┤    R2
    │ │ 001  │ Kaihatu  │   aaaa   │  ----  │
    │ ├──────┼──────────┼──────────┼────────┤   ┌──────────┐
    │ │ 002  │ Eigyou   │   bbbb   │  ----  │   │   BOX    │
    │ ├──────┼──────────┼──────────┼────────┤   │REGISTRATION│
    │ │ 003  │ Gijyutu  │   cccc   │  ----  │   │  /EDIT   │
    │ ├──────┼──────────┼──────────┼────────┤   └──────────┘
    │ │      │          │          │        │
    │ ├──────┼──────────┼──────────┼────────┤
    │ │      │          │          │        │ V
    │ └──────┴──────────┴──────────┴────────┘
    │        K13─[SAVE DOCUMENT] [DETAILS] [OPEN]─K14
    │  [ JOB BOX ] [ USER BOX ]
```

Fig. 9

```
                                                    11,12
75 ─┬─[icon] BOX SCREEN
    │         ┌──────────────┬──────────────┬──────┐
    │         │DOCUMENT NAME │    DATE      │ SIZE │
    │ [icon] │20121212090009│2012/12/12 09:00│21MB │ ∧
    │ [icon] │20121212100010│2012/12/12 10:00│21MB │
82(8)[icon] │20121212110011│2012/12/12 11:00│21MB │
    │ [icon] │20121212120012│2012/12/12 12:00│     │
    │ [icon]   FORM DOCUMENT                        │ V
    │  83(8)
    │  [ PRINT ] [TRANSMISSION] [PREVIEW] [CREATE FOLDER]  [BACK]
    │    K15       K16           K17        K18
```

DISPLAY INPUT DEVICE AND IMAGE FORMING APPARATUS HAVING TOUCH PANEL

INCORPORATION BY REFERENCE

This application is based upon and claims the benefit of priority from the corresponding Japanese Patent Application No. 2012-088295 filed on Apr. 9, 2012, the entire contents of which are incorporated herein by reference.

BACKGROUND

The present disclosure relates to a display input device having a display portion and a touch panel portion, and to an image forming apparatus having the touch panel portion.

Some of various electric apparatuses and electronic apparatuses have a display panel attached thereon. The display panel is combined with a touch panel allowing a setting input or an operation of the apparatus. For example, on the display panel, an image (for example, an icon or a character string) indicating data or a file, and the like are displayed. On the display panel, if the image indicating data or the like is cut and pasted or copied and pasted, the storage location of data or the like can be changed or the data or the like can be replicated. In this case, for example, a user needs to perform operations such as selecting an image indicating a target to be transferred or copied, displaying a menu, and selecting a desired process from the menu. However, a device having a button, such as a mouse, is not provided for the display panel with a touch panel. Therefore, such a display panel is not suitable for an operation using the menu, and it may be difficult to perform a cut-and-paste or copy-and-paste operation.

With respect to such a problem, an information terminal system that facilitates a cut-and-paste operation of data, an image, or the like on an information terminal apparatus, is known. Specifically, the information terminal system is composed of a pen-type pointing device and an information terminal apparatus. The pen-type pointing device has a mechanical switch, a first memory that stores data, determination means, and a first transmission circuit. The determination means determines whether or not data is stored in the first memory, in accordance with an operation of the mechanical switch. If the determination means has determined that data is stored, the first transmission circuit transmits the data stored in the first memory to the information terminal apparatus, and if the determination means has determined that data is not stored, the first transmission circuit transmits data indicating a reception mode to the information terminal apparatus. The information terminal apparatus has a second memory and a second transmission circuit. The second memory receives and stores data stored in the first memory and transmitted from the first transmission circuit. In accordance with the reception of the reception mode data transmitted from the first transmission circuit, the second transmission circuit transmits, to the pen-type pointing device, a selected piece of data among the data stored in the information terminal apparatus. In addition, the pen-type pointing device has storage control means that stores the data transmitted from the second transmission circuit in the first memory. The information terminal system having the above configuration can easily perform exchange of data, cut-and-paste processing of data, and copy-and-paste processing of data by using the pen-type pointing device.

The known information terminal system described above needs a pen-type pointing device. Therefore, the cost increases. In addition, by a mechanical switch operation of the pen-type pointing device (for example, an operation of pressing a push button switch provided on the top end of the pen-type pointing device), a target to be copied is designated or a copied content is pasted.

However, since a user needs to press the top end (head portion) of the pen-type pointing device while holding the pen-type pointing device like a pen, the pen-type pointing device is hard to use. In addition, even if a user uses the pen-type pointing device, such a copying or pasting operation is still complicate and thus cannot be performed intuitively. Thus, there is an aspect that the operation is hard to understand.

SUMMARY

A display input device according to one aspect of the present disclosure includes a display portion and a touch panel portion. The display portion displays a screen and an image and displays an object which is an image to be cut or copied. The touch panel portion is provided for the display portion, accepts an input from a user, detects a plurality of positions that are touched, and accepts a first operation of narrowing the interval between two points touched at the same time. In addition, the touch panel portion accepts an input of designating, as a designated object, the object displayed at one or both of the positions of the two touched points, and accepts the first operation as an input of giving an instruction to cut or copy the designated object.

A display input device according to another aspect of the present disclosure includes a display portion and a touch panel portion. The display portion displays a screen and an image and displays an object which is an image to be pasted. The touch panel portion is provided for the display portion, accepts an input from a user, detects a plurality of positions that are touched, and accepts a second operation of broadening the interval between two points touched at the same time. In addition, the touch panel portion accepts the second operation as an instruction to paste a designated object that has been cut or copied by being designated from the object displayed on the display portion. The display portion pastes and displays the designated object on a screen being displayed when the pasting instruction is given.

An image forming apparatus according to still another aspect of the present disclosure includes a display portion and a touch panel portion. The display portion displays a screen and an image and displays an object which is an image to be cut, copied, or pasted. The touch panel portion is provided for the display portion, accepts an input from a user, detects a plurality of positions that are touched, and accepts a first operation of narrowing the interval between two points touched at the same time and a second operation of broadening the interval between two points touched at the same time. The touch panel portion accepts an input of designating, as a designated object, the object displayed at one or both of the positions of the two touched points, accepts the first operation as an input of giving an instruction to cut or copy the designated object, and accepts the second operation as an instruction to paste the designated object. The display portion pastes and displays the designated object on a screen being displayed when the pasting instruction is given.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 is an explanation diagram showing an example of an initial setting screen of a box function according to the embodiment of the present disclosure.

FIG. 9 is an explanation diagram showing an example of a box screen on which an image indicating data and an image indicating a folder are displayed, according to the embodiment of the present disclosure.

FIG. 12 is an explanation diagram showing a summary of a pasting instruction for a designated object according to the embodiment of the present disclosure.

DETAILED DESCRIPTION OF THE PREFERRED EMBODIMENTS

Hereinafter, embodiments of the present disclosure will be described with reference to FIGS. 1 to 15. In the following description, a multifunction peripheral 100 (corresponding to an image forming apparatus) including an operation panel 1 (corresponding to a display input device) is used as an example. It is noted that matters such as configurations, arrangements, and the like described in the present embodiment are not intended to limit the scope of the present disclosure, and are merely illustrative.

(Schematic Configuration of Image Forming Apparatus)

Figure 1:
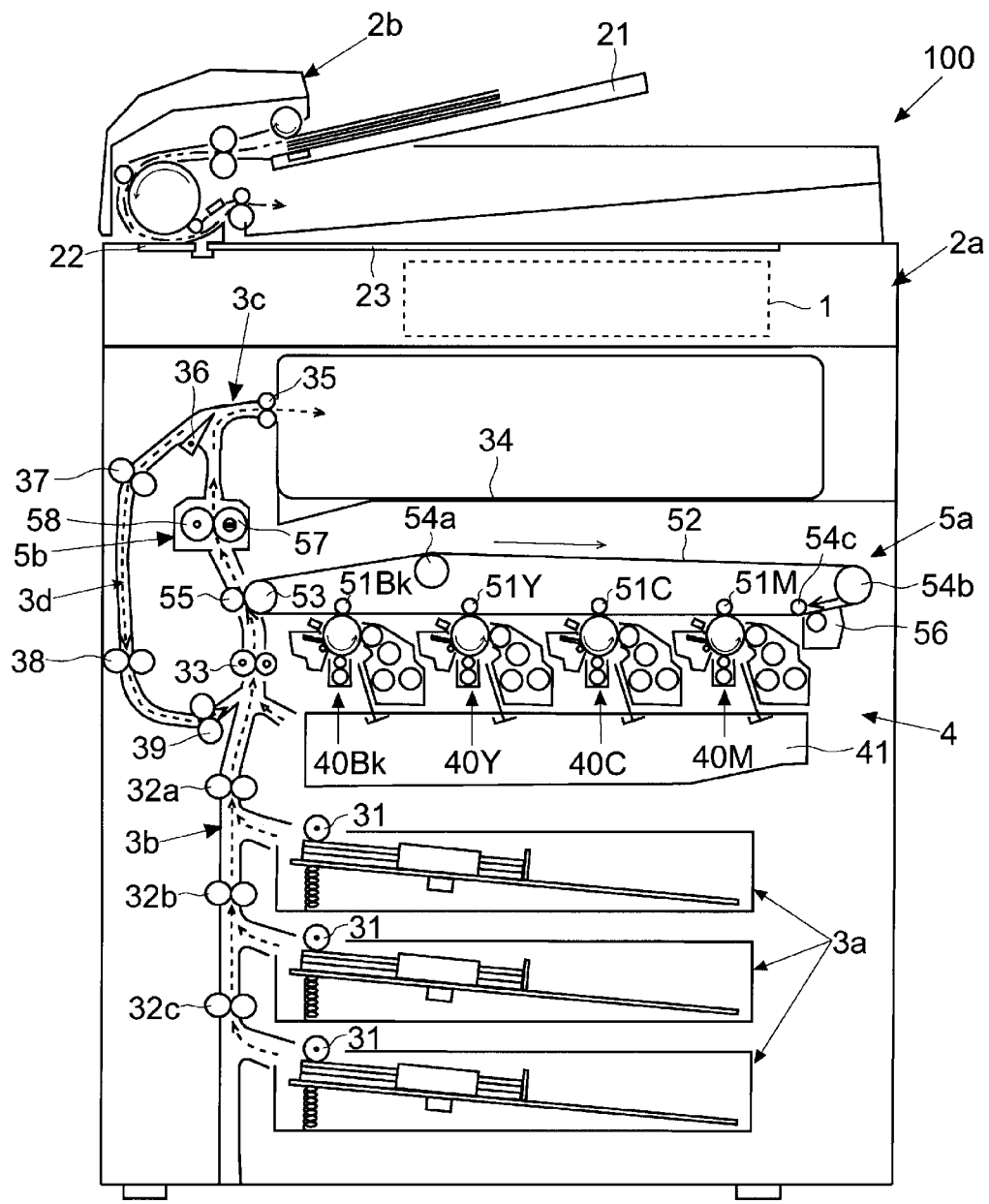
FIG. 1 is a front schematic sectional view showing a multifunction peripheral according to an embodiment of the present disclosure.

First, with reference to FIG. 1, the schematic configuration of the multifunction peripheral 100 according to an embodiment will be described. FIG. 1 is a front schematic sectional view showing an example of the multifunction peripheral 100.

As shown in FIG. 1, the operation panel 1 (described later in detail) that allows various types of setting for the multifunction peripheral 100 is provided so as to be directed forward, on the front surface of the multifunction peripheral 100. In addition, as shown in FIG. 1, the multifunction peripheral 100 of the present embodiment has an image reading portion 2a and a document sheet conveying portion 2b which are provided on an upper portion, and has sheet feed portions 3a, a conveying portion 3b, an image forming portion 4, an intermediate transfer portion 5a, a fixing portion 5b, a discharge conveying portion 3c, a both-side conveying portion 3d, and the like which are provided inside.

The document sheet conveying portion 2b has a document sheet tray 21. Document sheets to be copied or scanned are placed on the document sheet tray 21. Then, the document sheet conveying portion 2b automatically and continuously conveys the document sheets one by one from the document sheet tray 21 to a reading position (conveying reading contact glass 22). In addition, the document sheet conveying portion 2b is attached to the image reading portion 2a in an openable and closable fashion in the up-down direction via a supporting point at the back of the drawing of FIG. 1. The document sheet conveying portion 2b functions as a cover for pressing contact glass (conveying reading contact glass 22 and placement reading contact glass 23) of the image reading portion 2a from above.

As shown in FIG. 1, the placement reading contact glass 23 is provided on the upper surface of the image reading portion 2a. When a document sheet of a book or the like is to be read one by one, the document sheet is placed on the placement reading contact glass 23. Inside the image reading portion 2a, a lamp, a mirror, a lens, an image sensor, and the like are provided (not shown). The image sensor reads the document sheet, based on light reflected from the document sheet passed on the conveying reading contact glass 22 by the document sheet conveying portion 2b or a document sheet placed on the placement reading contact glass 23. Then, the image sensor converts the reflected light to an analog electric signal corresponding to the shading of an image, and quantizes the electric signal. Thus, image data of the document sheet is obtained. It is noted that the image reading portion 2a of the present embodiment can perform reading in color and also reading in black and white.

The plurality of sheet feed portions 3a in a main body of the multifunction peripheral 100 each contain a plurality of sheets of paper having the corresponding size (for example, an A-series or B-series formal size such as A4 sheet or B4 sheet, a letter size, or the like), including various types of paper (for example, copy paper, recycled paper, heavy paper, OHP sheet, and the like). The sheet feed portions 3a each have a sheet feed roller 31 which is rotationally driven, thereby conveying a sheet of paper one by one to the conveying portion 3b upon printing.

The conveying portion 3b is a passage that conveys a sheet of paper inside the apparatus from the sheet feed portion 3a to the image forming portion 4. The conveying portion 3b has provided therein: a guide plate that guides a sheet of paper; conveying roller pairs 32 (in FIG. 1, a total of three pairs of rollers 32a, 32b, and 32c from above) which are rotationally driven when a sheet of paper is conveyed; a registration roller pair 33 that causes a conveyed sheet of paper to stand by just before the image forming portion 4 and conveying the sheet of paper at a timing of transferring a formed toner image; and the like.

The image forming portion 4 includes a plurality of image forming units 40 (40Bk for black, 40Y for yellow, 40C for cyan, and 40M for magenta) and an exposure device 41. The image forming units 40 each have a photosensitive drum supported so as to be rotationally driven, a charging device provided around the photosensitive drum, a developing device, a cleaning device, and the like. Based on image data read by the image reading portion 2a, image data stored in a storage device 62 described later, or the like, the exposure device 41 emits laser light while turning on or off the laser light, and scans and exposes each photosensitive drum with the laser light. Then, by each of the image forming units 40 and the exposure device 41, a toner image is formed on the circumferential surface of each photosensitive drum.

The intermediate transfer portion 5a receives primary transfer of a toner image from each of the image forming units 40, and performs secondary transfer onto a sheet of paper. The intermediate transfer portion 5a includes primary transfer rollers 51Bk to 51M, an intermediate transfer belt 52, a drive roller 53, a plurality of driven rollers 54 (54a to 54c), a secondary transfer roller 55, a belt cleaning device 56, and the like. The intermediate transfer belt 52 is stretched over the drive roller 53 and the like, and circulates by rotational driving of the drive roller 53 connected to a drive mechanism (not shown) such as a motor. Then, transfer voltage is applied to each of the primary transfer rollers 51Bk to 51M, and a toner image of each photosensitive drum is transferred to the intermediate transfer belt 52. After the intermediate transfer belt 52 has received primary transfer such that the toner images are superimposed thereon without displacement, the toner image is transferred to a sheet of paper by the secondary transfer roller 55 to which predetermined voltage is applied.

The fixing portion 5b fixes a toner image transferred to a sheet of paper. The fixing portion 5b includes a heating roller 57 having a heat generator therein, and a pressure roller 58 pressed to the heating roller 57. When the sheet of paper passes through a nip portion between the heating roller 57 and the pressure roller 58, toner is heated and melted, whereby the toner image is fixed on the sheet of paper. The sheet of paper discharged from the fixing portion 5b is conveyed toward the discharge tray 34.

The discharge conveying portion 3c sorts printed sheets of paper by switching the paper conveying direction between the direction to the discharge tray 34 and the direction to the both-side conveying portion 3d. The discharge conveying portion 3c has a discharge roller pair 35 which is rotationally driven in a forward rotational direction so as to convey the sheet of paper in the direction to the discharge tray 34 or reversely rotates so as to perform switchback for both-side printing. The discharge conveying portion 3c has a switch flap 36 that switches the conveying direction of a sheet of paper. The switch flap 36 is configured to turn. The switch flap 36 is set at, as a basic position, a position for guiding a sheet of paper in the direction to the discharge tray 34 by closing the both-side conveying portion 3d, and upon both-side printing, turns to guide a switched-back sheet of paper having been printed for its one side, to the both-side conveying portion 3d. The both-side conveying portion 3d links the downstream side of the fixing portion 5b to the upstream side of the registration roller pair 33. In the both-side conveying portion 3d, a plurality of both-side conveying roller pairs 37 to 39 which are rotationally driven are provided for both-side printing, whereby a sheet of paper having been printed for its one side is conveyed.

(Operation Panel 1)

Figure 2:
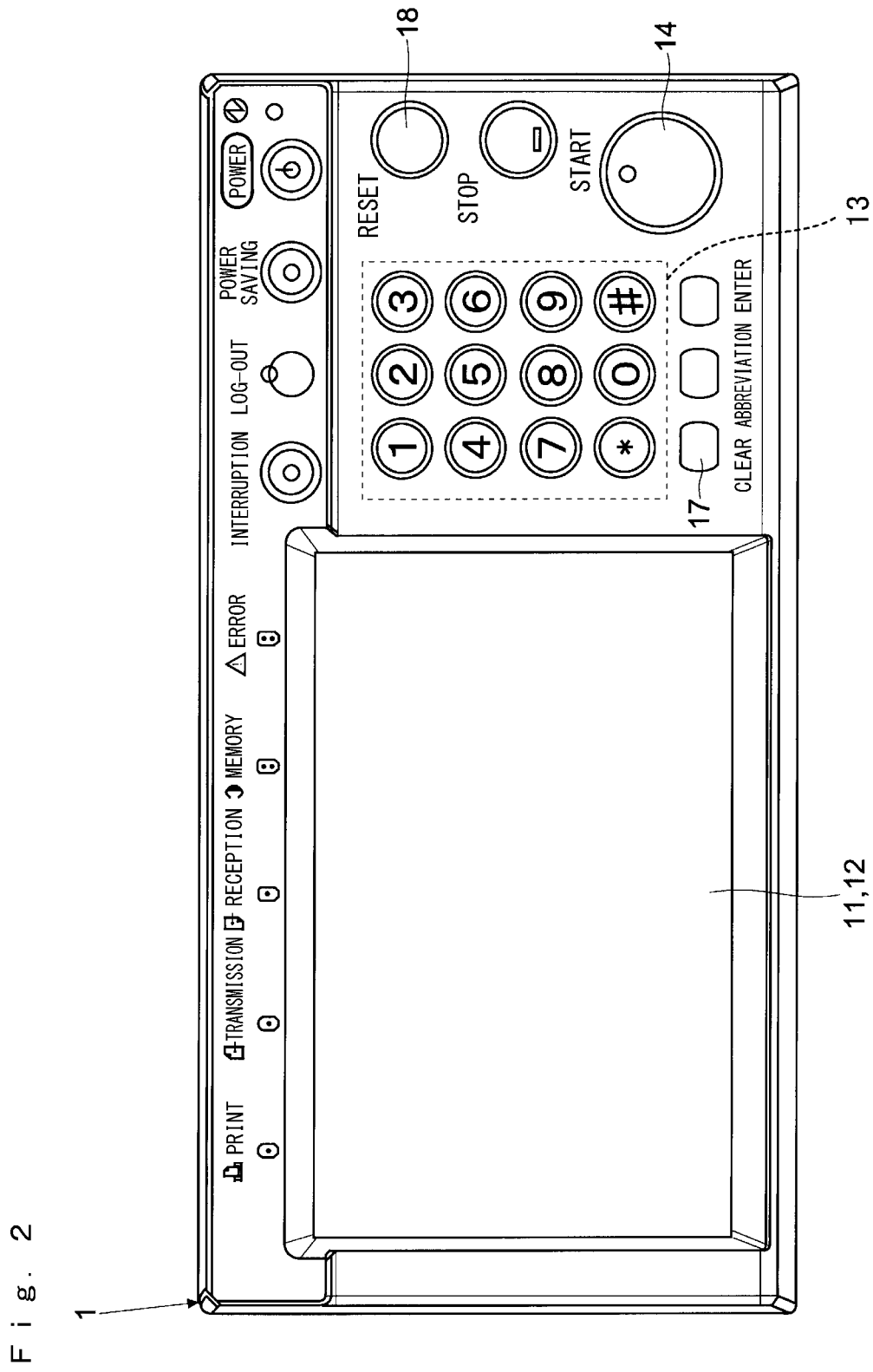
FIG. 2 is a plane view showing an example of an operation panel according to the embodiment of the present disclosure.

Next, with reference to FIG. 2, an example of the operation panel 1 according to an embodiment will be described. FIG. 2 is a plane view showing an example of the operation panel 1.

As shown in FIG. 1, the operation panel 1 is provided on an upper portion of the front surface of the multifunction peripheral 100. The operation panel 1 includes a display portion 11, a touch panel portion 12, and hardware keys (for example, a numeric keypad portion 13 for numeric input and a start key 14 for instruction to start processing such as copying).

For example, the display portion 11 is a liquid crystal display panel. The display portion 11 may be another type of display panel such as an organic EL panel. The display portion 11 displays a menu or a key that allows setting of the multifunction peripheral 100. A user can designate a key displayed on the display portion 11, thereby inputting various settings of the multifunction peripheral 100. The display portion 11 displays various images or screens indicating a status message or the like of the multifunction peripheral 100 or the like.

The touch panel portion 12 is provided on an upper surface of the display portion 11. The touch panel portion 12 detects a position or coordinates touched by a user. By comparing the display position of a key with the touched position, a key designated by a user is specified and the user's input is accepted.

The touch panel portion 12 can recognize a plurality of positions touched at the same time. Therefore, a touch panel of projected capacitive type can be used for the touch panel portion 12. It is noted that it is only necessary to recognize a plurality of positions touched at the same time, and the touch panel portion 12 is not necessarily limited to a projected capacitive type.

The display portion 11 of the present embodiment displays an object 8 which is an image to be cut, copied, or pasted. By performing cutting, copying, or pasting by using the touch panel portion 12, the object 8 designated to be cut or copied can be displayed on another screen. Examples of the object 8 includes an electronic label 81 (an image like memorandum containing a character string) and an image indicating data or a file (the details will be described later).

(Hardware Configurations of Multifunction Peripheral 100 and the Like)

Figure 3:
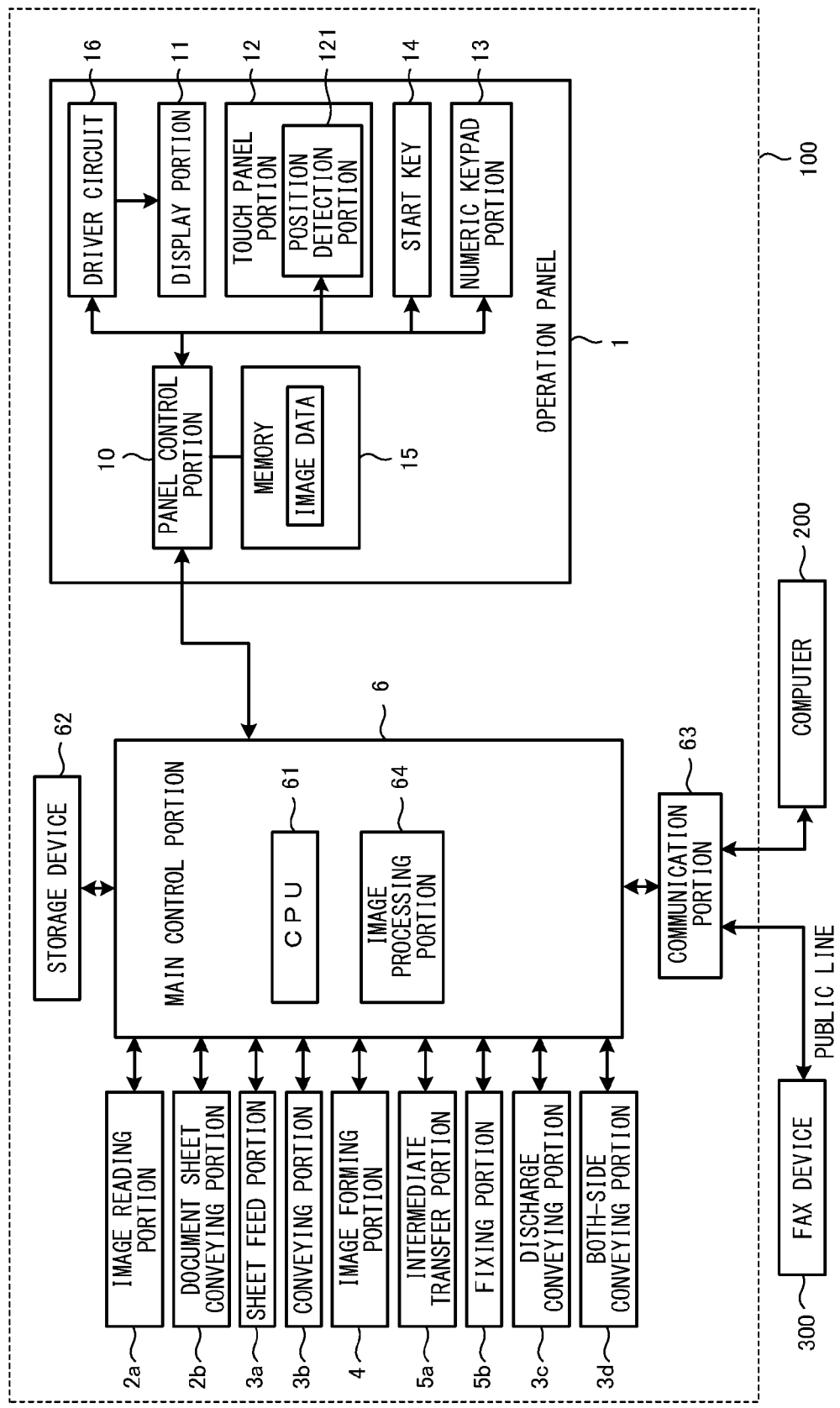
FIG. 3 is a block diagram showing an example of the hardware configurations of the multifunction peripheral and the operation panel according to the embodiment of the present disclosure.

Next, with reference to FIG. 3, an example of the hardware configurations of the multifunction peripheral 100 and the operation panel 1 according to the present embodiment will be described. FIG. 3 is a block diagram showing an example of the hardware configurations of the multifunction peripheral 100 and the operation panel 1.

A main control portion 6 is provided in the main body of the multifunction peripheral 100. For example, the main control portion 6 is connected to the operation panel 1, the document sheet conveying portion 2b, the image reading portion 2a, the sheet feed portion 3a, the conveying portion 3b, the image forming portion 4, the fixing portion 5b, the discharge conveying portion 3c, and the like, and controls these portions.

For example, the main control portion 6 includes a device that controls a CPU 61 and the like. The CPU 61 performs an arithmetic operation based on a developable control program stored in the storage device 62, thereby controlling each portion in the multifunction peripheral 100. It is noted that the main control portion 6 may be divided into several types of units for respective functions such as a main control portion that performs overall control and image processing, and an engine control portion that controls printing by, for example, performing image formation or turning on or off a motor and the like that rotate various rotary bodies. In the present embodiment, the case where such control portions are integrated as the main control portion 6 will be described.

The storage device 62 is connected to the main control portion 6. The storage device 62 is composed of a combination of a non-volatile storage device and a volatile storage device such as ROM, RAM, and HDD. The storage device 62 is configured to store various data such as a control program, control data, setting data, and image data of the multifunction peripheral 100.

The main control portion 6 is connected to an interface portion (hereinafter, referred to as a communication portion 63) having various connectors, a socket, a FAX modem, and the like. The communication portion 63 can be connected to a plurality of external computers 200 (for example, a personal computer or a server) or other FAX devices 300 (in FIG. 3, one external computer 200 and one FAX device 300 are shown for convenience) via a network, a public line, or the like. For example, image data obtained by the image reading portion 2a can be stored in the storage device 62 (box function), or can be transmitted to the external computer 200 or the other FAX device 300 (scanner function and FAX function). In addition, when image data is transmitted from the external computer 200 or the other FAX device 300 and inputted to the multifunction peripheral 100, the image data can be printed (printer function) or transmitted by FAX (FAX function), for example.

For example, the main control portion 6 has provided therein an image processing portion 64 that performs image processing for image data obtained by reading a document sheet by the image reading portion 2a or image data inputted to the multifunction peripheral 100 via the communication portion 63. For example, the image data processed by the image processing portion 64 is transmitted to the exposure device 41 so as to be used for scanning and exposure of the photosensitive drum, or is stored in the storage device 62.

The main control portion 6 recognizes an input given to the operation panel 1, and controls the multifunction peripheral 100 so that a job such as copying or scanning will be performed in accordance with the user's setting. The operation panel 1 of the present embodiment includes a panel control portion 10, the display portion 11, the touch panel portion 12, the hardware keys (for example, the numeric keypad portion 13 and the start key 14), a memory 15, a driver circuit 16, and the like. The panel control portion 10 is composed of a CPU, an IC, and the like. The panel control portion 10 controls display of the display portion 11, receives an output of the touch panel portion 12, and specifies a touched position (coordinates). Data such as a table indicating the correspondence between the output and the position (coordinates) of the touch panel portion 12 is stored in the memory 15. The memory 15 includes a ROM and a RAM. The panel control portion 10 compares a touched position with image data of a screen displayed on the display portion 11 when the position is touched, and recognizes a key displayed at the touched position. Thus, the panel control portion 10 recognizes a key designated by a user.

In a normal operation, a user selects each function of the multifunction peripheral 100, and selects setting items (for example, in the case of copy function, expansion/reduction, density, aggregation, both-side printing, and the like) that can be set on the selected function. In order to set setting values for the selected setting item, the user repeats designation (selection) of a key displayed on the display portion 11 from the display (a home screen 7, see FIG. 4) at the uppermost layer on the display portion 11. Then, the user switches the display screen of the display portion 11 upon every designation (selection) of a key. Finally, the setting values of the function that the user desires to set, are set. The panel control portion 10 recognizes that the selection and setting of the function have been performed, and transmits the recognized content to the main control portion 6 of the main body. Then, the main control portion 6 causes each portion such as the image forming portion 4 to perform an operation reflecting therein the function selected and set on the operation panel 1 so that the user's intension will be reflected in a job such as printing.

Image data of a screen or an image displayed on the display portion 11 is stored in, for example, the memory 15 in the operation panel 1. Therefore, the panel control portion 10 reads image data of a screen or an image to be next displayed, from the memory 15, in accordance with a key displayed at a touched position. It is noted that the image data of a screen or an image to be displayed on the display portion 11 may be stored in the storage device 62 on the main body side. In this case, the operation panel 1 receives image data to be displayed on the display portion 11, from the storage device 62 via the main control portion 6. In any case, the panel control portion 10 gives an instruction to the driver circuit 16 (for example, if the display portion 11 is a liquid crystal display panel, a liquid crystal driver IC) that actually controls the display of the display portion 11, thereby causing the display portion 11 to perform display based on image data. It is noted that the operation panel 1 may not have the panel control portion 10 and the memory 15, and instead, the components (the CPU 61 and the storage device 62) of the main control portion 6 may serve the functions of the panel control portion 10 and the memory 15.

The touch panel portion 12 has provided thereon a position detection portion 121 that detects a touched position. For example, the position detection portion 121 is an IC that detects a touched position (the coordinates of a touched point). For example, if the touch panel portion 12 includes a panel of projected capacitive type, the position detection portion 121 detects variation in the capacitance on the touch panel portion 12, and outputs a signal indicating one or a plurality of positions touched at the same time. The panel control portion 10 recognizes the touched position based on the output of the position detection portion 121.

(Home Screen 7 and Selection of Function)

Figure 4:
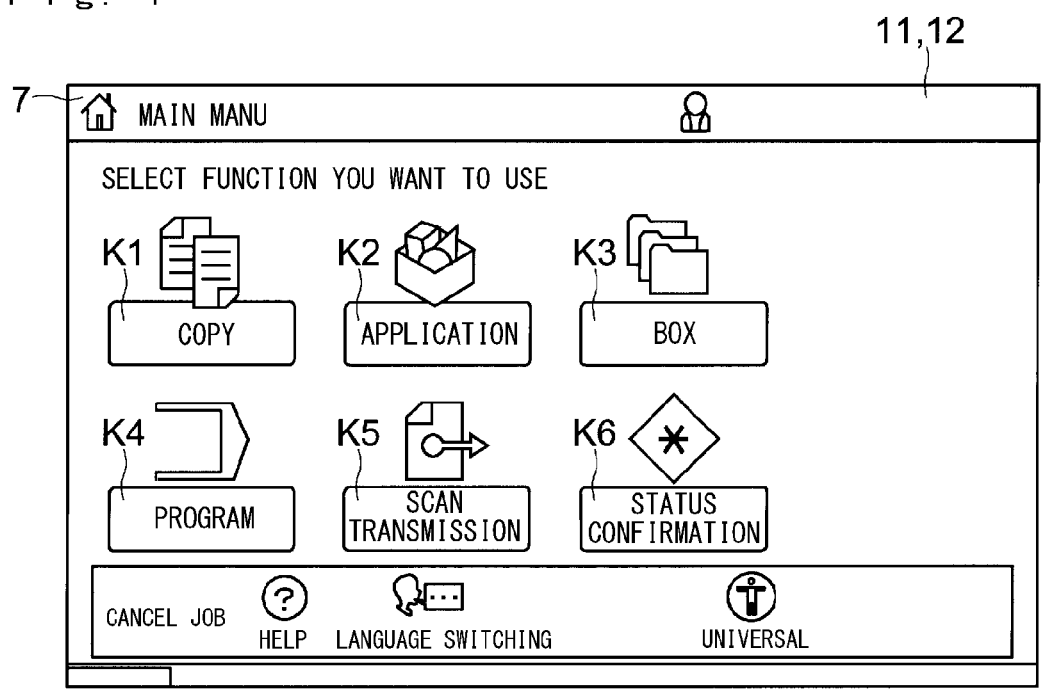
FIG. 4 is an explanation diagram showing an example of a home screen displayed on the operation panel according to the embodiment of the present disclosure.

Next, with reference to FIG. 4, the home screen 7 displayed on the operation panel 1 of the present embodiment will be described. FIG. 4 is an explanation diagram showing an example of the home screen 7 displayed on the operation panel 1.

On the operation panel 1 of the present embodiment, the home screen 7 that allows selection of a function to be used is provided. Hierarchically, the home screen 7 is positioned at the uppermost layer. For example, when a clear key 17 or a reset key 18 provided on the operation panel 1 is pressed (see FIG. 2), the panel control portion 10 causes the display portion 11 to display the home screen 7. In addition, for example, when a predetermined time has elapsed since an input to the operation panel 1 (an operation of touching the touch panel portion 12 or pressing a hardware key) is finished or when a job is completed, the panel control portion 10 may discard the current setting and cause the display portion 11 to display the home screen 7 (automatic clearing).

For example, on the home screen 7, a copy key K1, an application key K2, a box key K3, a program key K4, a scan transmission key K5, and a status confirmation key K6 are provided as function selection keys. The touch panel portion 12 outputs data (signal) indicating a touched position to the panel control portion 10. Based on an output mode of the touch panel portion 12, the panel control portion 10 recognizes that a function corresponding to the function selection key displayed at the touched position has been designated. Then, the panel control portion 10 displays an initial setting screen of the designated function. For example, when it is recognized that a copy function has been designated, the panel control portion 10 displays an initial setting screen 71 of the copy function. Thus, a user can select a function to be used, on the home screen 7.

(Electronic Label 81)

Figure 5:
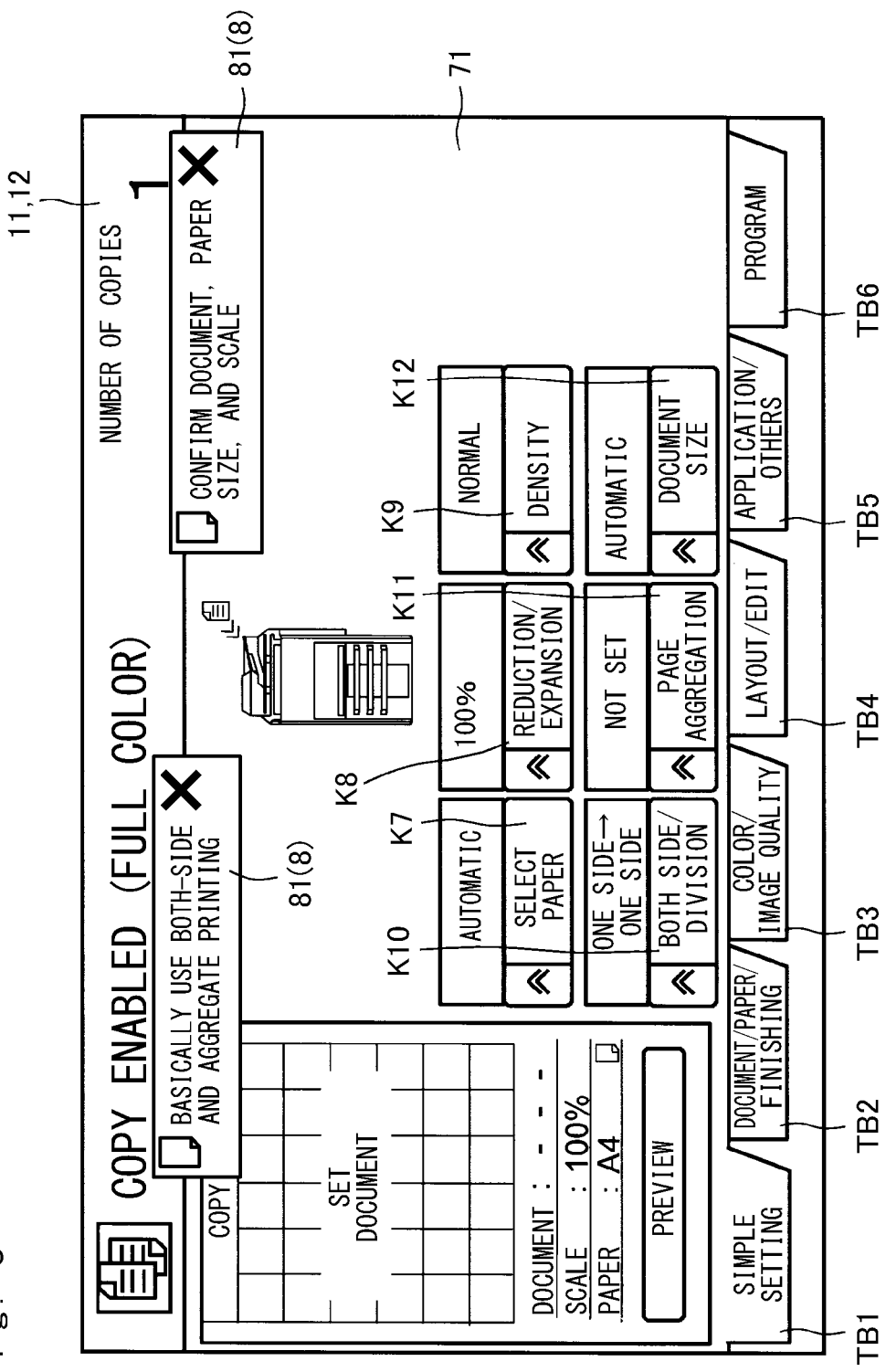
FIG. 5 is an explanation diagram showing an example of an initial setting screen of a copy function, on which an electronic label is pasted, according to the embodiment of the present disclosure.
Figure 6:
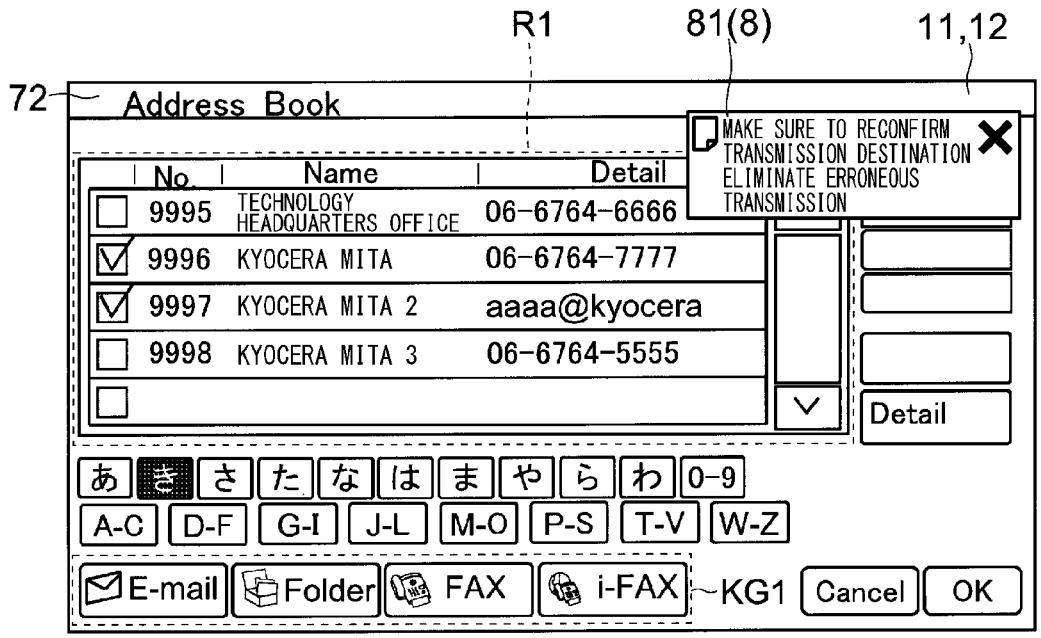
FIG. 6 is an explanation diagram showing an example of an initial setting screen of a scan transmission function, on which an electronic label is pasted, according to the embodiment of the present disclosure.
Figure 7:
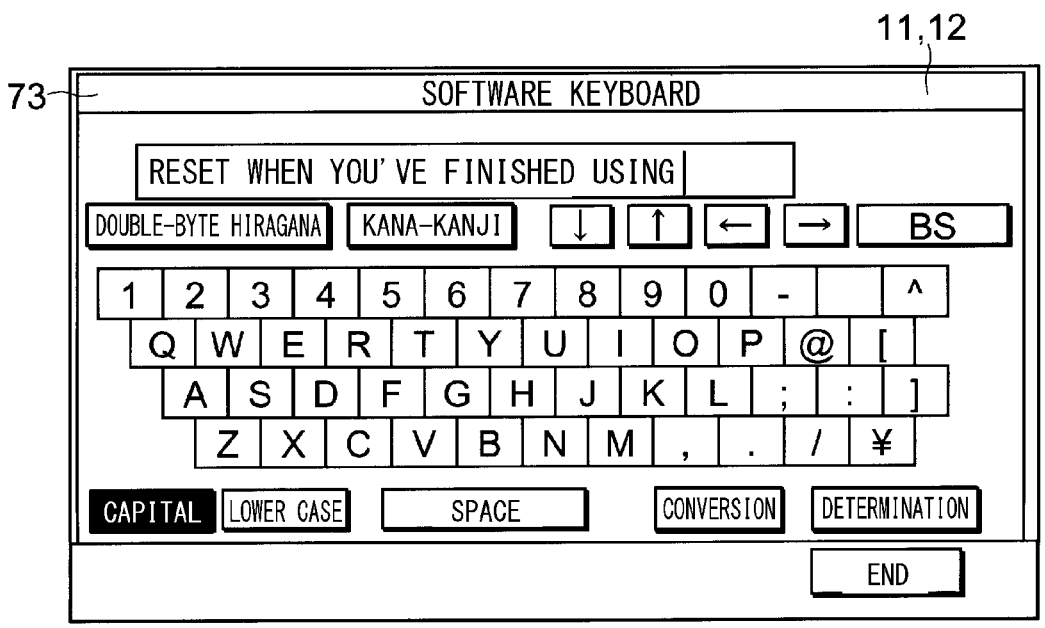
FIG. 7 is an explanation diagram showing an example of a software keyboard screen according to the embodiment of the present disclosure.

Next, with reference to FIGS. 5 to 7, the electronic label 81 as the object 8 will be described. FIG. 5 is an explanation diagram showing an example of the initial setting screen 71 of the copy function, on which the electronic label 81 is pasted. FIG. 6 is an explanation diagram showing an example of an initial setting screen 72 of a scan transmission function, on which the electronic label 81 is pasted. FIG. 7 is an explanation diagram showing an example of a software keyboard screen 73.

As described above, the object 8 is an image or data to be cut, copied, or pasted. By performing a pasting operation by an input to the touch panel portion 12, it is possible to newly display the object 8 for which a cutting or copying instruction is given, on a screen different from a screen on which the object 8 has been originally displayed.

Then, with reference to FIGS. 5 to 7, the electronic label 81 as an example of the object 8 will be described. It is noted that the electronic label 81 is an image to be displayed on the display portion 11, which is pasted on a screen like a paper label and contains text data such as a note.

In order to describe the electronic label 81, first, an example of a setting screen of the copy function shown in FIG. 5 will be described. The initial setting screen 71 of the copy function shown in FIG. 5 is a screen that the panel control portion 10 first causes the display portion 11 to display when the copy key K1 is pressed on the home screen 7.

As shown in FIG. 5, for example, a plurality of simple setting keys K7 to K12 that allow setting of setting items that are often used are provided on the initial setting screen 71 of the copy function. In FIG. 5, the simple setting key K7 for a setting item of "paper selection", the simple setting key K8 for a setting item of "expansion/reduction", and the like are displayed as an example.

In order to set setting items that are not displayed on the initial setting screen 71 (including a large number of setting items, e.g., a setting item of frame elimination, a setting item of margin, a setting item of reading resolution, and a setting item of document type), a position of a document/paper/finishing tab TB2, a color/image quality tab TB3, a layout/edit tab TB4, an application/others tab TB5, or a program tab TB6 displayed side by side with a simple setting tab TB1, is to be touched. The above setting items are each associated with one of the tabs in advance. When a position where the tab is displayed is touched, the panel control portion 10 causes the display portion 11 to display a setting screen on which a list of setting keys indicating the setting items associated with the tab designated by the touching operation is displayed.

For example, when a position where the sheet/paper/finishing tab TB2 is displayed is touched, the panel control portion 10 causes the display portion 11 to display a screen on which setting keys indicating setting items relevant to document or paper, such as a document size, a paper size, the direction of a document sheet or a paper sheet, and a paper feed source, are displayed. When a position where the color/image quality tab TB3 is displayed is touched, the panel control portion 10 causes the display portion 11 to display a screen on which setting keys indicating setting items relevant to color and image quality, such as a printing color (e.g., color or monochrome), a resolution, and shading adjustment of each color (black, cyan, magenta, and yellow), are displayed. When a position where the layout/edit tab TB4 is displayed is touched, the panel control portion 10 causes the display portion 11 to display a screen on which setting keys indicating setting items relevant to image arrangement and image data edit, such as aggregate printing and both-side printing, are displayed. When a position where the application/others tab TB5 is displayed is touched, the panel control portion 10 causes the display portion 11 to display a screen on which setting keys indicating setting items relevant to applicative matters, such as the size of margin and frame elimination processing, are displayed.

A user touches a display position of a tab, and then, touches a display position of one of the setting keys of the setting items displayed at this time, thereby designating the setting item. Thus, the panel control portion 10 displays a setting screen for the designated setting item. For example, when a user designates a setting item of aggregate printing, on a setting screen for aggregate printing, the user can set a setting value such as 2 in 1 or 4 in 1 or a setting value such as the type of boundary line. Thus, while switching the setting screen, the user can set a setting value of a desired setting item.

Next, an example of a setting screen of a scan transmission function shown in FIG. 6 will be described. The initial setting screen 72 of the scan transmission function shown in FIG. 6 is a screen that the panel control portion 10 first causes the display portion 11 to display when the scan transmission key K5 is pressed on the home screen 7.

The scan transmission function is a function of causing the image reading portion 2a to read a document sheet along with the start of a job, and transmitting image data of the read document sheet as an E-mail or transmitting the image data to a desired computer 200 or a desired FAX device 300.

For example, the panel control portion 10 causes the display portion 11 to display an address book as the initial setting screen 72 of the scan transmission function. Data of the address book is stored in the memory 15 of the operation panel 1 or the storage device 62 of the main body. When the address book is to be displayed, the panel control portion 10 reads the data of the address book from the memory 15 or the storage device 62.

An address list display area R1 on which a list of address names and address information is displayed is provided on the initial setting screen 72 of the scan transmission function. By touching the address list display area R1, a user can designate an address of a transmission destination. Then, after designating the address, if the user touches a display position of a key for a desired transmission method among a transmission method designation key group KG1, the user can designate the transmission method. When the transmission method has been designated, in accordance with the designated transmission method, the panel control portion 10 displays a setting screen that allows setting of the details for the transmission (for example, a screen that allows setting of the size and the like of image data to be transmitted), thereby causing the user to perform setting about the transmission.

Next, creation of the electronic label 81 will be described. In order to create the electronic label 81, a user performs a predetermined input to the operation panel 1, on a screen (setting screen) on which the user desires to newly paste the electronic label 81. For example, a method of touching the touch panel portion 12 for creating or pasting the electronic label 81, such as a method of touching the same position a plurality of times (for example, two or three times) or a method of keeping touching two touched positions without moving these positions, may be defined in advance. A hardware key that calls a mode for creating the electronic label 81 on the operation panel 1 and pasting the electronic label 81 on the screen, may be provided on the operation panel 1.

Based on the output or the like of the touch panel portion 12, when the panel control portion 10 has recognized an instruction input for creating the electronic label 81, the panel control portion 10 causes the display portion 11 to display the software keyboard screen 73 as shown in FIG. 7. The touch panel portion 12 accepts a touch on keys of characters, signs, and the like that are displayed. Based on the output of the touch panel portion 12, the panel control portion 10 recognizes a key displayed at a touched position, and recognizes the input content (a character, a number, or a sign that has been inputted). The touch panel portion 12 also accepts correction or deletion of the input content. Thus, a user can manually input a kanji character, a kana character, katakana, an alphabet, a number, various signs to be displayed on the electronic label 81, by using the software keyboard screen 73.

Then, when the electronic label 81 is closed, the panel control portion 10 displays the electronic label 81 containing the content inputted on the software keyboard screen 73, on a screen on which an instruction to create the electronic label 81 is given. In FIG. 5, as an example, the display portion 11 displays the electronic label 81 containing a character string of "CONFIRM DOCUMENT, PAPER SIZE, AND SCALE" on the upper right of the initial setting screen 71 of the copy function, and the electronic label 81 containing a character string of "BASICALLY USE BOTH-SIDE AND AGGREGATE PRINTING". In addition, in FIG. 6, as an example, the display portion 11 displays the electronic label 81 containing a character string of "MAKE SURE TO RECONFIRM TRANSMISSION DESTINATION, ELIMINATE ERRONEOUS TRANSMISSION" on the upper right of the initial setting screen 72 of the scan transmission function.

By touching the electronic label 81 and moving the touched position, a user can set the display position of the electronic label 81 to a desired position. In other words, based on the output of the touch panel portion 12, the panel control portion 10 recognizes an operation of touching the display position of the electronic label 81 and moving the touched position while keeping touching the touched position (drag-and-drop operation), and causes the display portion 11 to move the display position of the touched electronic label 81 in accordance with the movement of the touched position.

For example, the memory 15 of the operation panel 1 stores, for each of the created electronic labels 81, a screen on which the created electronic label 81 is to be displayed, a display position (coordinates) thereof on the screen, and a content (a character string or the like) contained in the electronic label 81. When the display of the display portion 11 is switched, the panel control portion 10 confirms the storage content of the memory 15, to determine whether or not there is an electronic label 81 to be displayed. If there is an electronic label 81 to be displayed, the panel control portion 10 causes the display portion 11 to display the electronic label 81. Thus, every time a specific screen is displayed, the panel control portion 10 causes the display portion 11 to display a specific electronic label 81.

It is noted that on each of the electronic labels 81 (in an area of the image of the electronic label 81), a mark of x is displayed. When the touch panel portion 12 has accepted that a display position of the mark of x has been touched, the panel control portion 10 causes the display portion 11 to quit displaying the electronic label 81 for which the mark of x has been touched. Thus, a user can delete the electronic label 81 that is unnecessary.

(Image Indicating Data and Image Indicating Folder)

Next, with reference to FIGS. 8 and 9, as the object 8, an image indicating data (hereinafter, for convenience, referred to as a "data image 82") and an image indicating a folder (hereinafter, for convenience, referred to as a "folder image 83") will be described. FIG. 8 is an explanation diagram showing an example of an initial setting screen 74 of a box function. FIG. 9 is an explanation diagram showing an example of a box screen 75 on which an image indicating data and an image indicating a folder are displayed.

In order to describe the data image 82 and the folder image 83, first, an example of various setting screens of the box function shown in FIGS. 8 and 9 will be described. When a display position of the box key K3 is touched to designate the box function on the home screen 7, the panel control portion 10 causes the display portion 11 to display the initial setting screen 74 shown in FIG. 8 as a first setting screen of the box function. A part of the storage area of the storage device 62 (HDD) is allocated for the box function. The allocated storage area is virtually divided on a box-by-box basis. For example, a user can store image data in a box and can reuse (printing, transmission, or the like) the image data stored in the box.

A box name list display area R2 is provided on the initial setting screen 74. By touching the box name list display area R2, a user can designate a box to be used. Then, after designating the box, by touching a display position of a document saving key K13, the user can store image data obtained by reading a document sheet by the image reading portion 2a, in the designated box (the HDD of the storage device 62). It is noted that when the document saving key K13 is designated, the panel control portion 10 displays a setting screen of a scanning content, thereby causing the user to perform setting about reading of a document sheet and storage of image data in the box. In addition, after designating the box, by touching a display position of an open key K14, the user can print or transmit image data or the like stored in the box. Examples of the setting screen of a scanning content includes a screen that allows setting of a resolution, the size of a document sheet, and the size of image data obtained by reading.

Then, when the open key K14 is designated in the state where a box is designated, as shown in FIG. 9, the panel control portion 10 displays the box screen 75 which is a setting screen about usage (printing or transmission) of data stored in the designated box, thereby causing a user to perform setting about reuse of the data stored in the box.

The panel control portion 10 displays the data image 82 indicating data stored in a box and the folder image 83 indicating a folder created in the box, on the box screen 75 of the display portion 11. The data image 82 includes an icon indicating data and an image indicating a document name, a creation date, and a size. In addition, the folder image 83 includes an icon and an image indicating a folder name.

When a display position of the data image 82 or the folder image 83 is touched, the touch panel portion 12 accepts an input for designating data or a folder to be used. For example, based on the output of the touch panel portion 12, the panel control portion 10 causes the display portion 11 to display the data image 82 designated to be used, in a white-black inversed state. When the panel control portion 10 has recognized that a display position of the folder image 83 has been touched based on the output of the touch panel portion 12, the panel control portion 10 causes the display portion 11 to newly display the data image 82 indicating data contained in the folder.

A print key K15, a transmission key K16, a preview key K17, a folder creation key K18, and the like are provided on the box screen 75. In the state where data to be used is designated, when the touch panel portion 12 has accepted that a display position of the print key K15 has been touched, the main control portion 6 controls paper feed, paper conveying operation, and image formation, to perform printing based on data corresponding to the designated data image 82. In the state where data to be used is designated, when the touch panel portion 12 has accepted that a display position of the transmission key K16 has been touched, the main control portion 6 controls the image processing portion 64 and the communication portion 63, to transmit data corresponding to the designated data image 82. In the state where data to be used is designated, when the touch panel portion 12 has accepted that a display position of the preview key K17 has been touched, the panel control portion 10 causes the display portion 11 to display a preview image indicating the content of data corresponding to the designated data image 82. When the touch panel portion 12 has accepted that a display position of the folder creation key K18 has been touched, the panel control portion 10 displays the software keyboard screen 73 as shown in FIG. 7, creates a folder having a folder name set on the software keyboard screen 73, and causes the display portion 11 to display the folder image 83 of the created folder.

It is noted that since there are a variety of setting screens, here, for convenience, only some of the setting screens of the copy function, the scan transmission function, and the box function have been described. However, although not shown, when an application function is designated, the panel control portion 10 causes the display portion 11 to display an initial setting screen for calling or setting an application installed in the storage device 62. For example, such an application is a program or data that enhances the usability of the multifunction peripheral 100. For example, there are a variety of applications for intended uses, such as an application that converts image data obtained by scanning a document such as a name card into text data or a database, and an application that converts data obtained by scanning a document into an electronic document.

When a program function is designated, the panel control portion 10 causes the display portion 11 to display an initial setting screen for calling (activating) a predetermined program or creating a program. The program defines in advance the setting values of one or a plurality of setting items on the operation panel 1. For example, the setting values of each setting item that are often used in combination are defined as the program in advance (registered in advance). When the program is called, the panel control portion 10 recognizes that setting has been performed by the setting values of each setting item defined by the called program. Thus, a user can set the setting values of a plurality of setting items by one touch.

When the status confirmation key K6 is designated, the panel control portion 10 causes the display portion 11 to display a status display screen that indicates the status of the multifunction peripheral 100. For example, the panel control portion 10 causes the display portion 11 to display the content of a job currently being executed, such as a printing state or a document reading state, on the status display screen. The panel control portion 10 may cause the display portion 11 to display the cumulative total number of printed sheets, a remaining sheet amount of each sheet feed portion 3a, or the like on the status display screen. Alternatively, the panel control portion 10 may cause the display portion 11 to display the status of each device or portion in the multifunction peripheral 100, such as the used memory or remaining memory of the storage device 62.

(Designation of Object 8 and Selection of Cutting or Copying)

Figure 10:
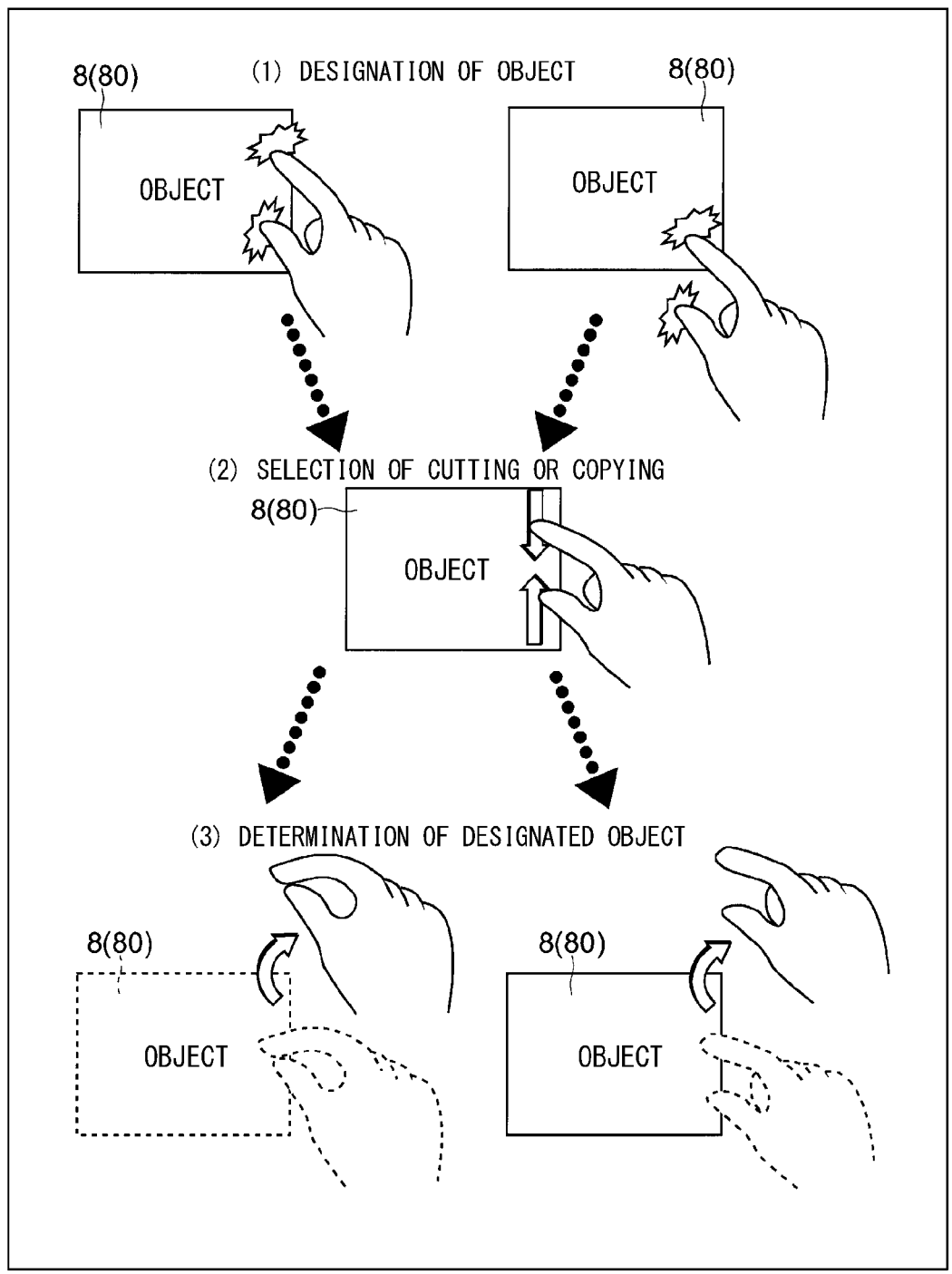
FIG. 10 is an explanation diagram showing a summary of designation of an object and selection of cutting or copying according to the embodiment of the present disclosure.
Figure 11:
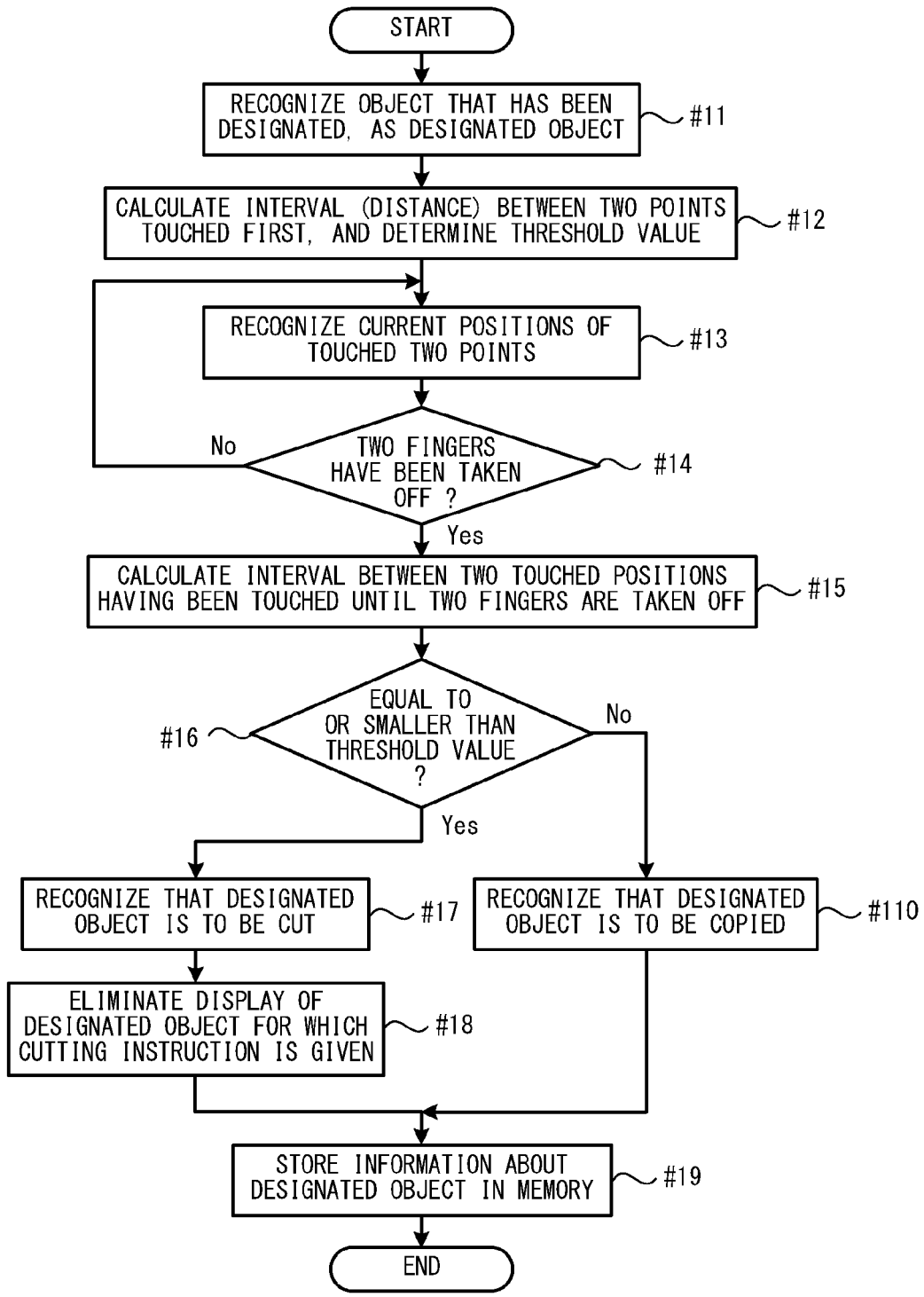
FIG. 11 is a flowchart showing an example of a flow of designation of an object to be cut or copied, according to the embodiment of the present disclosure.
Figure 1:
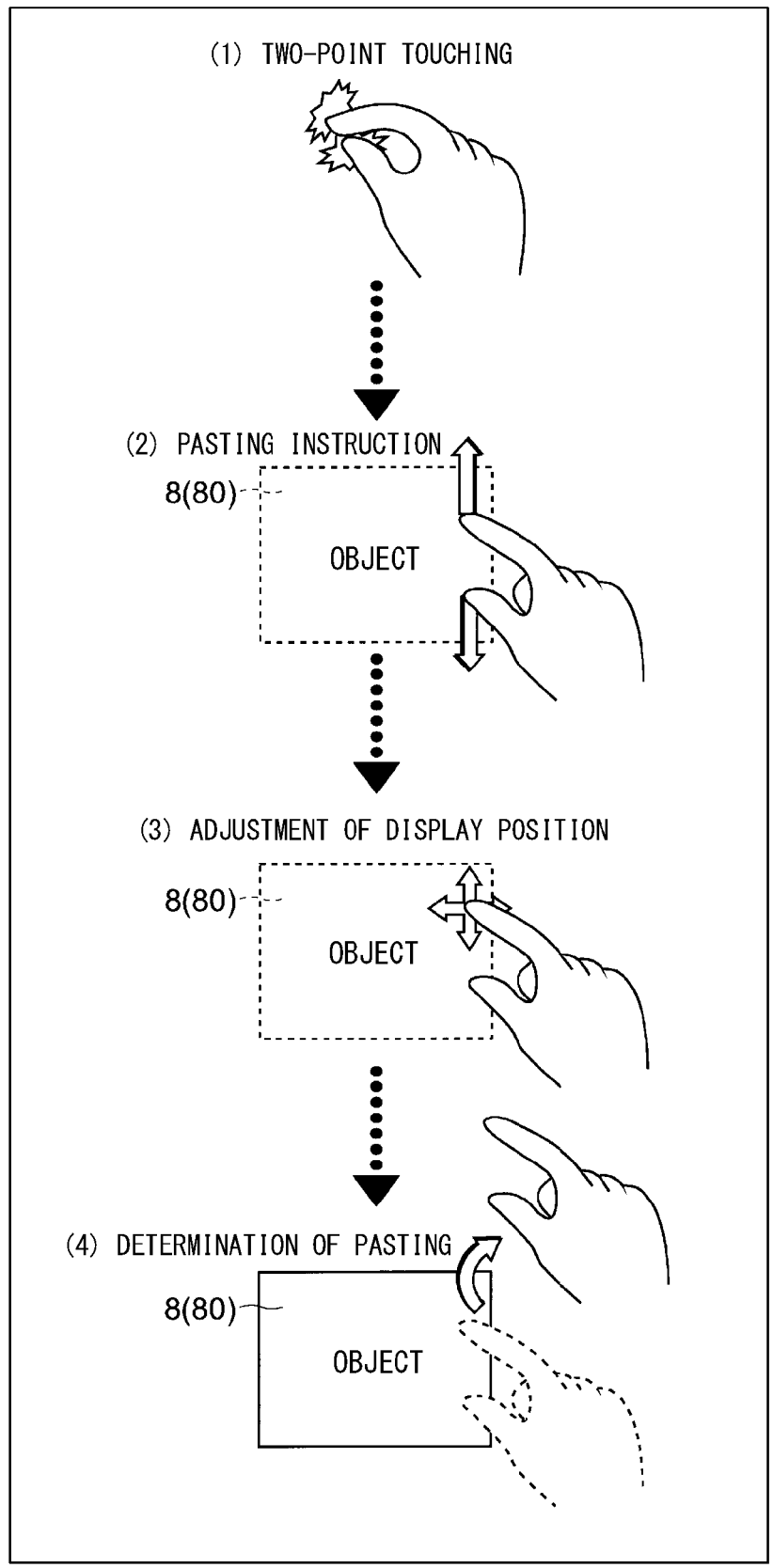

Next, with reference to FIGS. 10 and 11, an example of designation of the object 8 to be cut or copied will be described. FIG. 10 is an explanation diagram showing a summary of designation of the object 8 and selection of cutting or copying. FIG. 11 is a flowchart showing an example of a flow of designation of the object 8 to be cut or copied.

As described above, in the operation panel 1 and the multifunction peripheral 100 of the present embodiment, images (objects 8) that can be cut, copied, or pasted include the electronic label 81, the data image 82, and the folder image 83. It is noted that images other than the electronic label 81, the data image 82, and the folder image 83 may be used as the object 8.

In the operation panel 1 and the multifunction peripheral 100 of the present embodiment, a user can intuitively and easily designate the object 8 to be cut or copied and paste the designated object 8 on any screen. Here, first, with reference to FIG. 10, the summary of designation of the object 8 and selection of cutting or copying of a designated object 80 will be described.

First, in order to designate the object 8 to be cut or copied, a user touches two points at a display position of the object 8. At this time, as shown on the left side at the uppermost stage in FIG. 10, the touch panel portion 12 may accept designation of the object 8 when two-point touching is performed such that the two touched positions are both included within an area where the object 8 is displayed. In such a case where the object 8 is small like the data image 82 or the folder image 83, it may be difficult to touch two points at the same time. Accordingly, as shown on the right side at the uppermost stage in FIG. 10, the touch panel portion 12 may accept designation of the object 8 when two-point touching is performed such that at least one of two touched positions is included within an area where the object 8 is displayed. Thus, when two points are touched at the same time, the touch panel portion 12 accepts an input of designating the object 8 displayed at a position indicated by one or both of the two touched points. It is noted that the object 8 that has been designated is referred to as a "designated object 80".

As shown at the middle stage in FIG. 10, a user gives an instruction (selects) to cut or copy the designated object 80 by an operation (first operation) of narrowing the interval between the two touched points. The interval (distance) between the two touched points can be calculated based on the difference between the coordinates of the two touched points. For example, the interval between the two points can be calculated by obtaining a root of the sum of the square of the difference between distances in the X-axis direction (horizontal direction) and the square of the difference between distances in the Y-axis direction (vertical direction).

In the description of the present embodiment, if the interval (distance) between the two points when the interval is narrowed by an operation (first operation) of narrowing the interval between the two touched points is equal to or smaller than a threshold value, the touch panel portion 12 accepts the operation as an input of cutting the designated object 80, and if the interval (distance) between the two points exceeds the threshold value, the touch panel portion 12 accepts the operation as an input of copying the designated object 80. It is noted that if the interval (distance) between the two points when the interval is narrowed by the first operation is equal to or smaller than the threshold value, the touch panel portion 12 may accept the operation as an input of copying the designated object 80, and if the interval (distance) between the two points exceeds the threshold value, the touch panel portion 12 may accept the operation as an input of cutting the designated object 80. Thus, a user can select cutting or copying of the designated object 80 in accordance with the narrowed amount of the interval between the two touched points.

Since the interval (distance) between the two touched points is changed by the first operation, the interval between the two points to be compared with the threshold value may be the interval (distance) between the two points when two fingers are taken off. Alternatively, the distance between the two touched points when the interval is narrowed to be the smallest may be compared with the threshold value. In addition, the threshold value can be freely defined. In addition, the threshold value may be a fixed value. However, since the interval between fingers when two points on the touch panel portion 12 are touched at the same time differs among individuals, the threshold value may be changed in accordance with the interval (distance) between two points that have been touched first (for example, the threshold value may be a half of the interval of two points that have been touched first).

Then, when the fingers are both taken off from the two touched points on the touch panel portion 12, the designated object 80 and cutting or copying thereof are determined. For example, as shown on the left side at the lowermost stage in FIG. 10, like picking up the designated object 80, when two fingers are taken off from the touch panel portion 12 such that the interval of the two touched points is equal to or smaller than the threshold value, the touch panel portion 12 accepts such an operation as an input of cutting the designated object 80. Thus, a cutting operation of the designated object 80 can be performed by an operation like actually picking something. In addition, as shown on the right side at the lowermost stage in FIG. 10, when the designated object 80 is lightly pinched so as to keep the interval between the two touched points longer than a certain length so that the interval between the two touched points will not be equal to or smaller than the threshold value, and then in this state, when two fingers are taken off from the touch panel portion 12, the touch panel portion 12 accepts such an operation as an input of copying the designated object 80. Thus, a copying operation of the designated object 80 can be performed by an operation like actually moving something while holding the same.

When the designated object 80 is cut, the display portion 11 stops displaying the designated object 80 for which a cutting instruction is given. It is noted that when the designated object 80 is copied, the display portion 11 continues to display the designated object 80 for which a copying instruction is given.

When the designated object 80 is cut or copied, the memory 15 of the operation panel 1 stores information about the designated object 80 (information about the content of the designated object 8, a screen on which the object 8 is designated, a time when the object 8 is designated, and the like) and information indicating the operation type, i.e., cutting operation or copying operation.

Next, with reference to FIG. 11, an example of a flow of a process for designating the object 8 and selecting cutting or copying of the designated object 80 will be described. START in FIG. 11 indicates a point when, in the state where the display portion 11 performs display after the main power supply of the multifunction peripheral 100 is turned on, the touch panel portion 12 has accepted two-point touching performed on a display position of the object 8, and then based on the output of the touch panel portion 12, the panel control portion 10 has recognized that the two-point touching on the display position of the object 8 has been performed.

First, the panel control portion 10 recognizes the object 8 designated by the two-point touching, as the designated object 80 (step #11). In addition, based on the output of the touch panel portion 12, the panel control portion 10 recognizes the positions (coordinates) of the two points that have been touched first, calculates the interval (distance) between the two points that have been touched first, and determines the threshold value based on the calculated interval (step #12). For example, the threshold value is a fraction of the interval between the two points that have been touched first. It is noted that if a fixed value is used as the threshold value, it is not necessary to calculate the interval (distance) between the two points that have been touched first.

Then, based on the output of the touch panel portion 12, the panel control portion 10 recognizes the current positions of the two touched positions (step #13). Further, based on the output of the touch panel portion 12, the panel control portion 10 determines whether or not the two fingers have been taken off from two touched positions on the touch panel portion 12 (whether or not the touched points have disappeared) (step #14).

If any of the fingers are not taken off from the touch panel portion 12 (No in step #14), the flow returns to step #13. On the other hand, if all the fingers are taken off from the touch panel portion 12 so that the touched points have disappeared (Yes in step #14), the panel control portion 10 calculates the interval between the two touched positions when the two fingers are taken off, based on the output of the touch panel portion 12 (step #15). It is noted that instead of calculating the interval when the two fingers are taken off, the panel control portion 10 may calculate the distance when the interval between the two touched points has become the smallest until the two fingers are taken off since the two points have been touched (the object 8 has been designated).

Then, the panel control portion 10 determines whether or not the interval between the two touched positions that have been touched until the two fingers are taken off is equal to or smaller than the threshold value (step #16). If the interval is equal to or smaller than the threshold value (Yes in step #16), the panel control portion 10 recognizes that the designated object 80 is to be cut (step #17). Then, the panel control portion 10 deletes the display of the designated object 80 for which a cutting instruction is given (step #18). Further, the panel control portion 10 stores information about the designated object 8 in the memory 15 (step #19). Then, the process for designating the object 8 and selecting cutting or copying thereof is ended (END). On the other hand, if the interval exceeds the threshold value (No in step #16), the panel control portion 10 recognizes that the designated object 80 is to be copied (step #110). Then, the flow proceeds to step #19.

(Flow of Pasting of Object 8)

Figure 13:
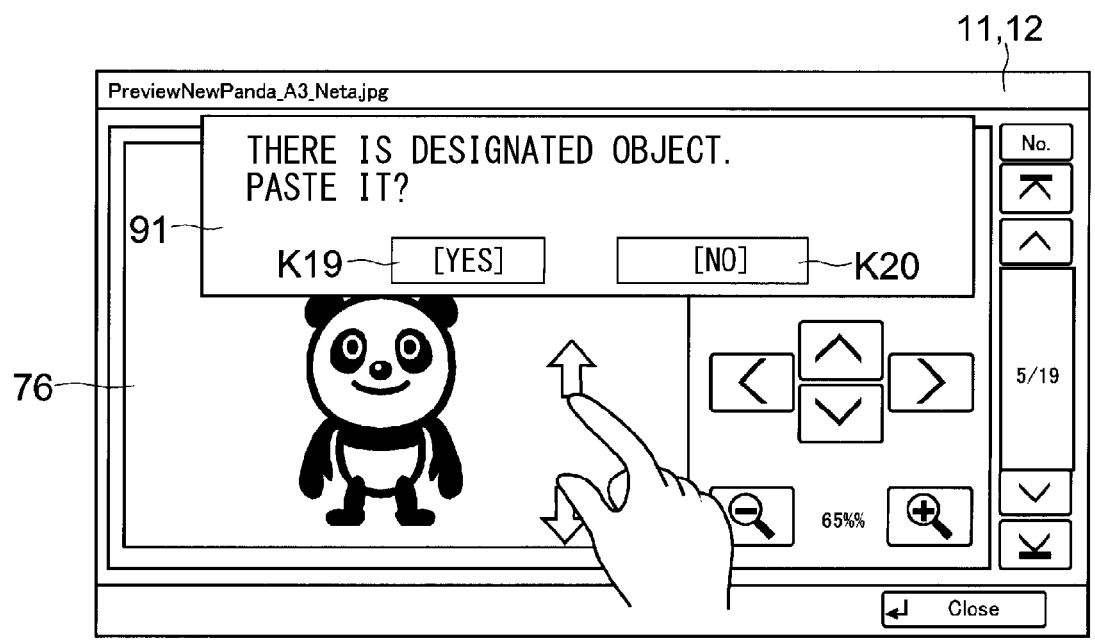
FIG. 13 is an explanation diagram showing an example of a dialogue screen that allows confirmation of whether or not to paste a designated object, according to the embodiment of the present disclosure.
Figure 14:
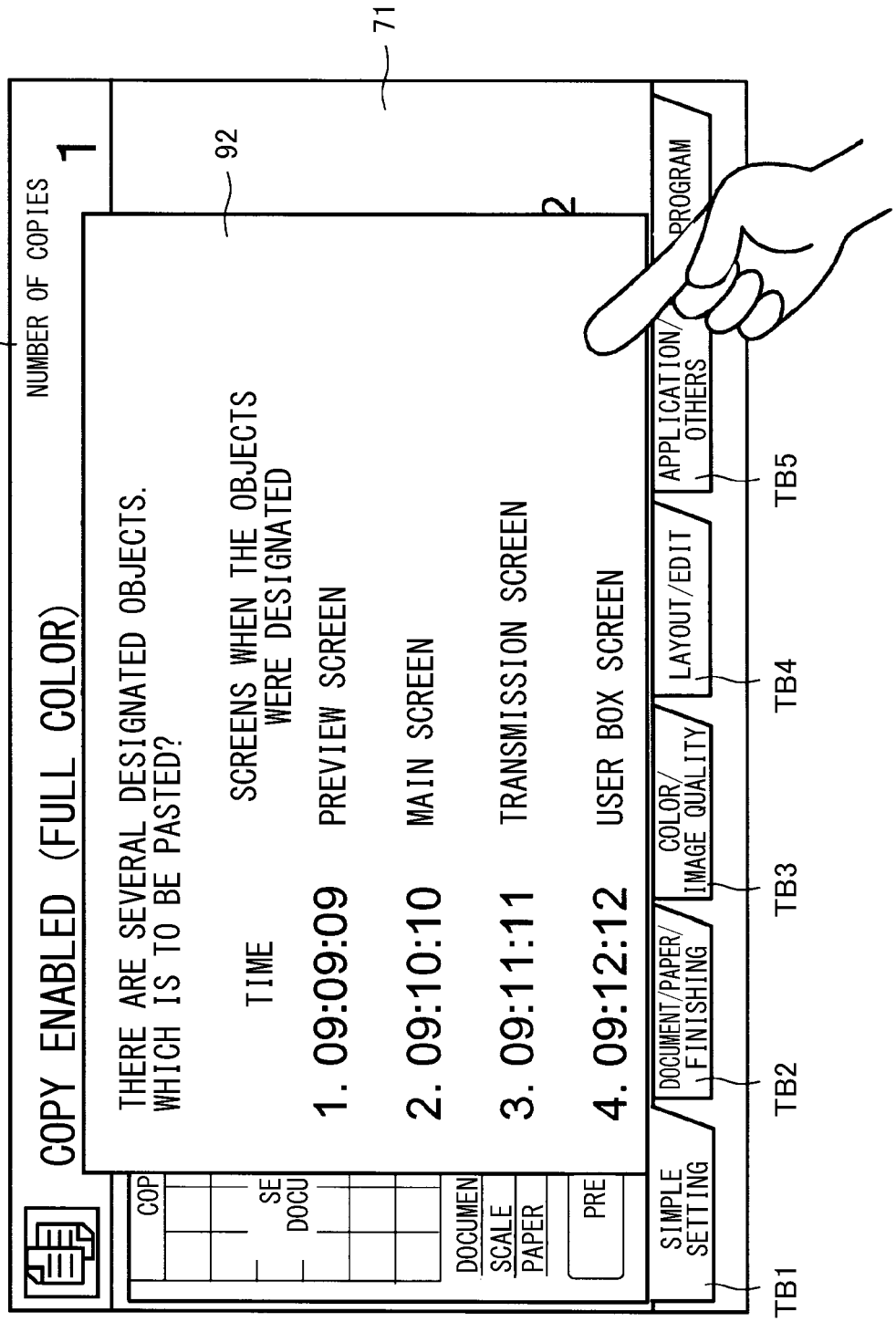
FIG. 14 is an explanation diagram showing an example of a selection screen that allows selection of an object to be pasted among a plurality of designated objects, according to the embodiment of the present disclosure.
Figure 15:
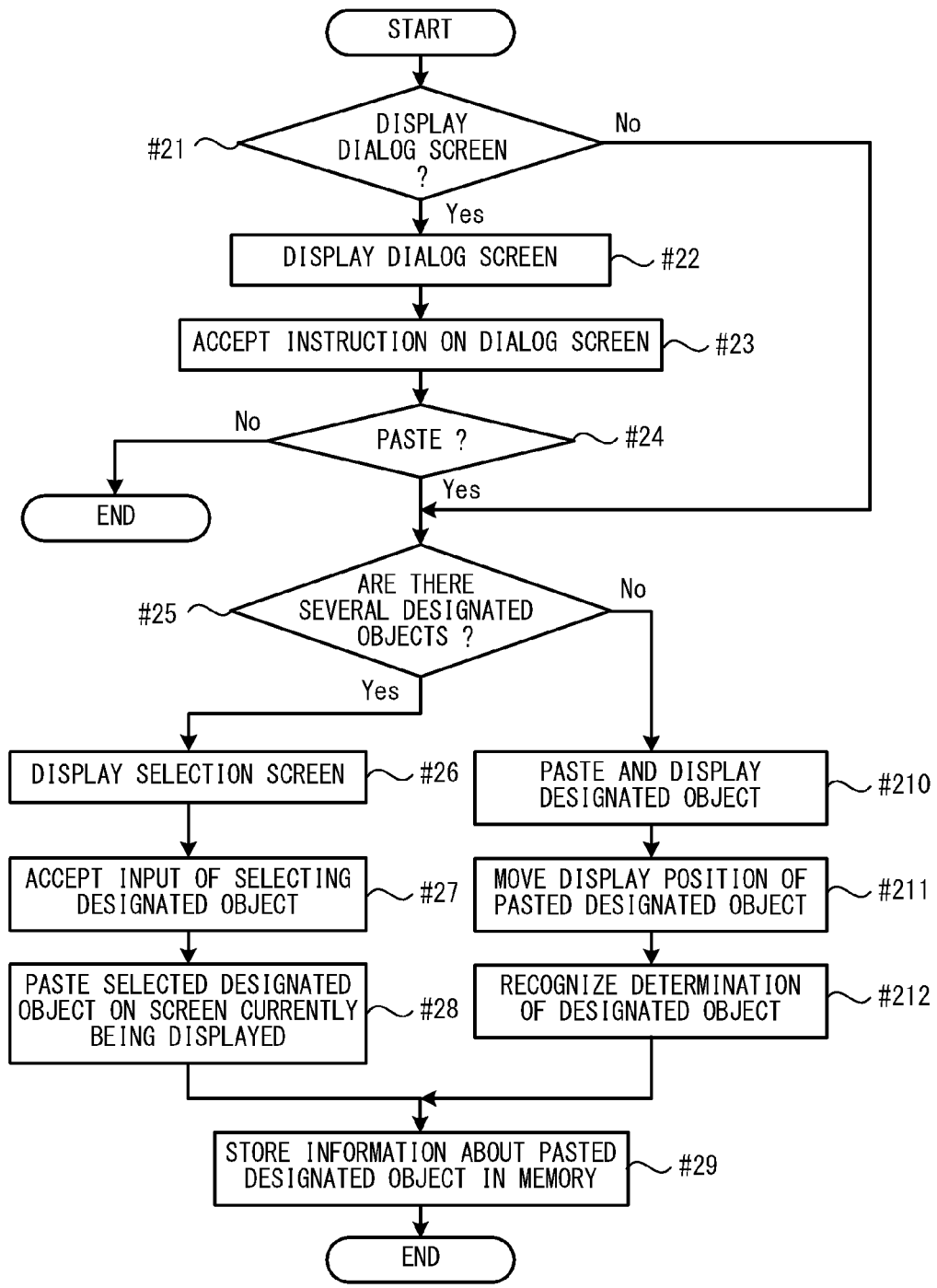
FIG. 15 is a flowchart showing an example of a flow of a pasting process for a designated object according to the embodiment of the present disclosure.

Next, with reference to FIGS. 12 to 15, an example of pasting of the designated object 80 will be described. FIG. 12 is an explanation diagram showing a summary of a pasting instruction for the designated object 80. FIG. 13 is an explanation diagram showing an example of a dialogue screen 91 that allows confirmation of whether or not to paste the designated object 80. FIG. 14 is an explanation diagram showing an example of a selection screen 92 that allows selection of an object 8 to be pasted among a plurality of designated objects 80. FIG. 15 is a flowchart showing an example of a flow of a pasting process for the designated object 80.

As described above, in the operation panel 1 and the multifunction peripheral 100 of the present embodiment, a user can designate the object 8 to be cut or copied. In addition, in the operation panel 1 and the multifunction peripheral 100 of the present embodiment, a user can intuitively and easily paste the designated object 8 on a desired (any) screen (setting screen). For example, the electronic label 81 cut or copied on a setting screen of the copy function can be pasted on a setting screen of another function such as the scan transmission function, the program function, or the box function. In addition, if the data image 82 or the folder image 83 cut or copied on the box screen 75 is pasted on another box screen, data corresponding to the data image 82 or the folder image 83 that has been pasted can be stored in the other box.

First, with reference to FIG. 12, a summary of pasting of the designated object 80 will be described. In order to start pasting of the designated object 80, as shown at the uppermost stage in FIG. 12, a user touches two points on the touch panel portion 12. As shown at the uppermost stage in FIG. 12, when the designated object 80 is to be pasted, the user touches two points at a position where the object 8 is not displayed on the touch panel portion 12.

Then, the user performs an operation (second operation) of broadening the interval between the two touched points. The touch panel portion 12 accepts the second operation as an instruction to paste the designated object 80. Then, as shown in the second stage from above in FIG. 12, the display portion 11 displays (pastes and displays) the object 8 designated to be cut or copied. Thus, by opening the fingers, the designated object 80 is expanded on the display portion 11, and the designated object 80 can be intuitively pasted.

Then, as shown at the third stage from above in FIG. 12, by moving the fingers touching the two points, a user can move the display position of the pasted designated object 80. In other words, the display portion 11 changes the display position of the pasted designated object 80 in accordance with the movement amount and the movement direction of the two points detected on the touch panel portion 12. For example, the display portion 11 changes the display position of the designated object 80 so as to move the center position of the designated object 80 by the same movement amount as that of one point of the two touched points.

Thus, the display position of the designated object 80 can be adjusted before pasting on the screen currently being displayed is determined.

Then, as shown at the lowermost stage in FIG. 12, when the fingers are both taken off from the two touched points on the touch panel portion 12, pasting of the designated object 80 is determined. Thus, the designated object 80 can be pasted by an operation of taking off the fingers after opening them.

Thus, pasting of the designated object 80 on the screen currently being displayed can be intuitively and easily determined merely by taking off the fingers from the touch panel portion 12.

Next, with reference to FIG. 13, display of the dialogue screen 91 that allows confirmation of whether or not to paste the designated object 80 will be described. In pasting of the designated object 80, the touch panel portion 12 accepts an operation of touching two points at the same time and the second operation of broadening the interval between the two points, as an instruction to paste the designated object 80. Thus, the display portion 11 displays (pastes and displays) the designated object 80 in an undetermined state.

However, even if a user performs the second operation of broadening the interval between the two touched points, the user does not always desire to paste the designated object 80. For example, in the case where the second operation is allocated for an operation other than pasting of the designated object 80, even if a user performs the second operation, the user does not always particularly desire to paste the designated object 80.

FIG. 13 shows an example of a preview image display screen 76 displayed on the display portion 11, for example, when a display position of the preview key K17 is touched on the box screen 75 or the like, or upon copying. When a preview image is to be displayed, the image processing portion 64 reduces data stored in the storage device 62 or image data obtained by reading by the image reading portion 2a, to generate image data for preview image display. The panel control portion 10 receives the image data for preview image display and causes the display portion 11 to display a preview image.

In the operation panel 1 of the present embodiment, the preview image can be expanded in order to allow fine confirmation. The touch panel portion 12 accepts an operation of touching two points on the displayed preview image and broadening the interval between the two touched points (second operation), as an instruction to expand the preview image.

Thus, in the case where an operation (second operation) of broadening the interval between the two touched points is allocated for an operation (of expanding and displaying the preview image) other than pasting of the designated object 80, when the second operation is performed, as shown in FIG. 13, the display portion 11 displays the dialogue screen 91 that allows confirmation of whether or not to paste the designated object 80.

A Yes key K19 and a No key K20 are displayed on the dialogue screen 91. The touch panel portion 12 accepts a touch at a position where the Yes key K19 is displayed, as an instruction to execute pasting of the designated object 80. The touch panel portion 12 accepts a touch at a position where the No key K20 is displayed, as an instruction not to paste the designated object 80, and executes an operation other than pasting of the designated object 80.

It is noted that in order to touch a display position of the Yes key K19 or the No key K20 on the displayed dialogue screen 91, it is necessary to take off fingers from the two touched points on the touch panel portion 12 once. When the dialogue screen 91 is displayed, the touch panel portion 12 does not accept the operation of taking off both fingers from the two touched points on the touch panel portion 12, as determination of pasting of the designated object 80.

When a position where the Yes key K19 is displayed is touched on the dialogue screen 91, pasting of the designated object 80 is determined, and the display portion 11 displays the designated object 80. On the other hand, when a position where the No key K20 is displayed is touched on the dialogue screen 91, pasting of the designated object 80 is not performed. In the case where an operation (second operation) of broadening the interval between the two touched points is allocated for an operation (of expanding and displaying the preview image) other than pasting of the designated object 80, the display portion 11 displays a result of the operation other than pasting of the designated object 80.

Thus, when the second operation is performed for the purpose other than pasting of the designated object 80, pasting of the designated object 80 can be prevented from being executed against the intention of a user. Therefore, operations such as pasting of the designated object 80 can be facilitated.

It is noted that even in the case where an operation (second operation) of broadening the interval between the two touched points is not allocated for an operation other than pasting of the designated object 80, the display portion 11 may always display the dialogue screen 91 when the second operation is performed.

Thus, a user can confirm in advance whether or not to paste the designated object 80, and unnecessary pasting of the designated object 80 can be prevented.

If the second operation is performed shortly after the designated object 80 is designated, it is highly possible that the designated object 80 is to be pasted. Accordingly, within a predetermined time after the designated object 80 is designated (for example, within several tens of seconds to several minutes after the object 8 is designated) (for example, the panel control portion 10 counts time), the display portion 11 may not display the dialogue screen 91 and the touch panel portion 12 may accept the second operation as an instruction to paste the designated object 80.

Thus, during a short period after the designated object 80 is designated (within a predetermined time), pasting of the designated object 80 can be preferentially performed. Therefore, during a period when it is highly possible that pasting is to be performed, pasting of the designated object 80 can be performed promptly and smoothly.

After the object 8 is designated, an instruction for copying or cutting by the first operation can be repeatedly performed a plurality of times. Therefore, when the touch panel portion 12 has accepted an operation (second operation) of broadening the interval between the two touched points, which designated object 80 is to be pasted among the objects 8 that have been designated, becomes a problem. Accordingly, when the touch panel portion 12 has accepted the second operation, the display portion 11 may paste and display the object 8 designated to be cut or pasted just before the second operation (the designated object 80 that has been designated last).

Thus, it becomes possible to prevent a plurality of objects 8 including unnecessary ones from being pasted at the same time on a screen currently being displayed.

In the state where there are a plurality of objects 8 designated to be cut or copied, when the touch panel portion 12 has accepted the second operation, the display portion 11 may display the selection screen 92 as shown in FIG. 14. The display portion 11 displays, on the selection screen 92, the objects 8 that have been designated since the multifunction peripheral 100 is powered on or is recovered from a power saving mode or since a predetermined storage time ago from the present. For example, the display portion 11 displays, on the selection screen 92, information indicating the contents of the designated objects 80, such as a time when each designated object 80 is designated and a screen displayed when each designated object 80 is designated. In addition, the display portion 11 may display the type (e.g., the electronic label 81 or the data image 82) of each designated object 80.

A user touches a display position of the designated object 80 to be pasted, among the designated objects 80 displayed on the selection screen 92. When the display position is touched, the touch panel portion 12 accepts the touching operation as an instruction to execute pasting of the designated object 80 displayed at the touched position. It is noted that, on the selection screen 92, in order to touch the display position of the designated object 80 to be pasted, it is necessary to take off both fingers from the two touched points on the touch panel portion 12 once. Therefore, when the selection screen 92 is displayed, the touch panel portion 12 does not accept an operation of taking off both fingers from the two touched points on the touch panel portion 12, as determination of pasting of the designated object 80.

Thus, of a plurality of designated objects 80, only the designated object 80 that a user desires to paste can be pasted on a screen currently being displayed.

Next, with reference to FIG. 15, an example of a flow of a pasting process for the designated object 80 will be described. It is noted that in FIG. 15, the case where, when a plurality of designated objects 80 are designated, the designated object 80 that has been designated last is not pasted but the selection screen 92 is displayed, will be described.

First, START in FIG. 15 indicates a point when, in the state where the display portion 11 performs display after the main power supply is turned on, the designated object 80 has been already designated, the touch panel portion 12 has accepted an operation of touching two points and broadening the interval between the two touched points (second operation), and then based on the output of the touch panel portion 12, the panel control portion 10 has recognized that the second operation has been performed.

Next, the panel control portion 10 determines whether or not to display the dialogue screen 91 (step #21). For example, at the present, on a screen displayed on the display portion 11, if the second operation is allocated for an operation other than pasting of the designated object 80, the panel control portion 10 may determine to display the dialogue screen 91. In addition, within a predetermined time after the designated object 80 is designated, the panel control portion 10 may determine not to display the dialogue screen 91.

If the dialogue screen 91 is to be displayed (Yes in step #21), the panel control portion 10 causes the display portion 11 to display the dialogue screen 91 (step #22). Then, the touch panel portion 12 accepts an instruction on the dialogue screen 91 (step #23). Then, based on the output of the touch panel portion 12, the panel control portion 10 determines whether or not to paste the designated object 80 (step #24).

If it is not necessary to paste the designated object 80 (if the touch panel portion 12 has accepted a touch at a position where "NO" is displayed on the dialogue screen 91) (No in step #24), the present flow is ended. On the other hand, if it is necessary to paste the designated object 80 (Yes in step #24) or if it is not necessary to display the dialogue screen 91 in step #21 (No in step #21), the panel control portion 10 confirms the storage content of the memory 15 to determine whether or not there are a plurality of designated objects 80 (step #25).

If there are a plurality of designated objects 80 (Yes in step #25), the panel control portion 10 causes the display portion 11 to display the selection screen 92 (step #26). Then, the touch panel portion 12 accepts an input of selecting the designated object 80 to be pasted among the designated objects 80 displayed on the selection screen 92 (step #27). Then, the panel control portion 10 determinately pastes and displays the selected designated object 80 on a screen (displays the selected designated object 80 in a pasted manner) (step #28).

Then, the panel control portion 10 stores information about the pasted designated object 80 in the memory 15 (step #29). Thus, thereafter, until the pasted object 8 is cut, by confirming the storage content of the memory 15, the panel control portion 10 displays the pasted object 8 every time the screen on which the object 8 is pasted is displayed. In step #29, the pasting process for the designated object 80 is ended (END).

On the other hand, if there are not a plurality of designated objects 80 (No in step #25), the panel control portion 10 causes the display portion 11 to paste and display the designated object 80 such that the designated object 80 overlaps with at least one point of the two touched points (step #210).

Then, based on the movement amount and the movement direction of the touched position on the touch panel portion 12, the panel control portion 10 causes the display portion 11 to move the display position of the designated object 80 pasted in an undetermined state (step #211). For example, the panel control portion 10 calculates the movement amount and the movement direction from the position (coordinates) of one point of the two points touched shortly after the second operation, and causes the display portion 11 to move the display position of the designated object 80 in an undetermined state, in accordance with the movement amount and the movement direction that are calculated.

Then, when the touch panel portion 12 has accepted that the touched points have disappeared (fingers are taken off from the touch panel portion 12), the panel control portion 10 recognizes that the pasted designated object 80 has been determined (step #212). Then, the panel control portion 10 stores information about the pasted designated object 80 in the memory 15 (step #29).

The display input device (operation panel 1) according to the present embodiment includes: the display portion 11 which displays a screen and an image and displays the object 8 which is an image to be cut, copied, or pasted; and the touch panel portion 12 which is provided for the display portion 11 and which accepts an input from a user, detects a plurality of positions that are touched, and accepts the first operation of narrowing the interval between two points touched at the same time and the second operation of broadening the interval between two points touched at the same time. The touch panel portion 12 accepts an input of designating the object 8 displayed at one or both of the positions of the two touched points, as the designated object 80, accepts the first operation as an input of giving an instruction to cut or copy the designated object 80, and accepts the second operation as an instruction to paste the designated object 80. The display portion 11 pastes and displays the designated object 80 on a screen being displayed when the pasting instruction is given. Thus, the object 8 can be easily designated, and a cutting or copying instruction can be given by an intuitive operation (first operation) like pinching the object 8 with fingers. In addition, the designated object 80 can be pasted on a screen currently being displayed, by an intuitive operation (second operation) like performing expansion with fingers. Therefore, transfer, copying, and pasting of the designated object 80 onto a screen to which the current screen needs to be switched can be easily and intuitively performed. As a result, usage of the display input device can be facilitated.

In addition, if the interval between the two points narrowed by the first operation is equal to or smaller than a predetermined threshold value, the touch panel portion 12 accepts the first operation as an input of giving an instruction to cut the designated object 80, and if the interval between the two points narrowed by the first operation exceeds the predetermined threshold value, the touch panel portion 12 accepts the first operation as an input of giving an instruction to copy the designated object 80. Alternatively, if the interval between the two points narrowed by the first operation is equal to or smaller than the predetermined threshold value, the touch panel portion 12 accepts the first operation as an input of giving an instruction to copy the designated object 80, and if the interval between the two points narrowed by the first operation exceeds the predetermined threshold value, the touch panel portion 12 accepts the first operation as an input of giving an instruction to cut the designated object 80. Thus, whether to perform cutting or copying can be selected based on the degree of movement (movement amount) of two fingers used in touching by the first operation. Therefore, it is not necessary to perform an operation of displaying a menu that allows selection of whether to perform cutting or copying, or an operation of selecting whether to perform cutting or copying from the displayed menu. Thus, the selection of cutting or copying can be easily and intuitively performed.

In addition, the image forming apparatus (multifunction peripheral 100) includes the display input device (operation panel 1) according to the present embodiment. The image forming apparatus (multifunction peripheral 100) includes a user-friendly display input device that allows a user to intuitively designate the object 8 to be cut or copied or to intuitively paste the designated object 80. Therefore, a user-friendly image forming apparatus can be provided.

Next, another embodiment will be described. In the above embodiment, an example where the panel control portion 10 recognizes, as the designated object 80, one object 8 displayed at a position where two-point touching is performed, has been described. However, the touch panel portion 12 may accept designation of a plurality of objects 8 by one two-point touching operation or one first operation. For example, when two objects 8 are touched, the panel control portion 10 may recognize that the two objects 8 have been designated, based on the output of the touch panel portion 12. Alternatively, when two objects 8 are touched, the panel control portion 10 may recognize that a plurality of objects 8 displayed on a trajectory of the touched positions obtained when the interval between the two touched points are narrowed have been designated. Then, upon pasting of the objects 8, the panel control portion 10 may cause the display portion 11 to display, in a pasted manner, all the plurality of objects 8 designated by the one two-point touching operation or the one first operation, on a screen currently being displayed, at the same time.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
a display portion that displays a screen and an image and displays an object which is an image to be cut or copied; and
a touch panel portion that is provided for the display portion and that accepts an input from a user, detects a plurality of positions that are touched, and accepts a first operation of narrowing the interval between two points touched at the same time by two fingers of the user,
wherein the touch panel portion accepts an input of designating, as a designated object, the object displayed at one or both of the positions of the two touched points;
wherein the touch panel portion, if the interval between the two points narrowed by the first operation is equal to or smaller than a predetermined threshold value, accepts the first operation as an input of giving an instruction to cut the designated object, and the touch panel portion, if the interval between the two points narrowed by the first operation exceeds the predetermined threshold value, accepts the first operation as an input of giving an instruction to copy the designated object;
wherein the touch panel portion accepts, as an input of determining cutting of the designated object, that the two fingers of the user have been taken off from the touch panel portion and the touched points have disappeared, and the interval between the two points immediately before the fingers were taken off is equal to or smaller than the predetermined threshold value, and the touch panel portion accepts, as an input of determining copying of the designated object, that the two fingers of the user have been taken off from the touch panel portion and the touched points have disappeared, and the interval between the two points immediately before the two fingers were taken off exceeds the predetermined threshold value; and wherein after the input of determining cutting of the designated object is accepted, display of the designated object is deleted, and after the input of determining copying of the designated object is accepted, the display of the designated object is maintained.

2. The display input device according to claim 1, wherein the display portion displays an object which is an image to be pasted,
the touch panel portion accepts a second operation of broadening the interval between the two points touched at the same time, and accepts the second operation as an instruction to paste the designated object, and
the display portion pastes and displays the designated object on a screen being displayed when the pasting instruction is given.

3. The display input device according to claim 2, wherein when the second operation is performed, the display portion displays a dialogue screen that allows confirmation of whether or not to paste the designated object,
when the touch panel portion has accepted an input of pasting the designated object, the display portion pastes and displays the designated object on the screen being displayed, and
when the touch panel portion has accepted an input of not pasting the designated object, the display portion does not display the designated object on the screen being displayed.

4. The display input device according to claim 3, wherein when the second operation is allocated for an operation other than pasting of the designated object, the display portion displays the dialogue screen.

5. The display input device according to claim 3, wherein when the second operation is performed, within a predetermined time after the designated object is designated, the display portion pastes and displays the designated object on the screen being displayed without displaying the dialogue screen.

6. The display input device according to claim 2, wherein in a state where a plurality of the designated objects to be cut or copied are designated, when an instruction to paste the designated object is given by the second operation, the display portion pastes and displays the designated object that has been designated last, on the screen being displayed.

7. The display input device according to claim 2, wherein in a state where a plurality of the designated objects to be cut or copied are designated, when an instruction to paste the designated object is given by the second operation, the display portion displays a selection screen that allows designation of the designated object to be pasted among the plurality of designated objects, and pastes and displays, on the screen being displayed, the designated object for which, on the selection screen, the touch panel portion has accepted an input of pasting.

8. The display input device according to claim 2, wherein when the display portion pastes and displays the designated object based on the second operation,
the touch panel portion accepts, as an input of determining pasting of the designated object, that the two points touched by the second operation are both no longer touched, and
the display portion displays the designated object determined to be pasted, every time a screen on which the designated object is pasted is displayed.

9. The display input device according to claim 2, wherein when the display portion pastes and displays the designated object based on the second operation, the display portion moves a display position of the designated object that is pasted and displayed, in accordance with a movement amount and a movement direction of the two points touched by the second operation.

10. The display input device according to claim 1, wherein the display portion displays an object which is an image to be pasted,
the touch panel portion accepts a second operation of broadening the interval between the two points touched at the same time, and accepts the second operation as an instruction to paste the designated object, and
the display portion pastes and displays the designated object on a screen being displayed when the pasting instruction is given.

11. An image forming apparatus comprising:
a display portion that displays a screen and an image and displays an object which is an image to be cut, copied, or pasted; and
a touch panel portion that is provided for the display portion and that accepts an input from a user, detects a plurality of positions that are touched, and accepts a first operation of narrowing the interval between two points touched at the same time by two fingers of the user and a second operation of broadening the interval between two points touched at the same time by two fingers of the user,
wherein the touch panel portion accepts an input of designating, as a designated object, the object displayed at one or both of the positions of the two touched points, and the touch panel portion, if the interval between the two points narrowed by the first operation is equal to or smaller than a predetermined threshold value, accepts the first operation as an input of giving an instruction to cut the designated object, and the touch panel portion, if the interval between the two points narrowed by the first operation exceeds the predetermined threshold value, accepts the first operation as an input of giving an instruction to copy the designated object,
wherein the touch panel portion accepts, as an input of determining cutting of the designated object, that the two fingers of the user have been taken off from the touch panel portion and the touched points have disappeared, and the interval between the two points immediately before the fingers were taken off is equal to or smaller than the predetermined threshold value, and the touch panel portion accepts, as an input of determining copying of the designated object, that the two fingers of the user have been taken off from the touch panel portion and the touched points have disappeared, and the interval between the two points immediately before the two fingers were taken off exceeds the predetermined threshold value,
wherein after the input of determining cutting of the designated object is accepted, display of the designated object is deleted, and after the input of determining copying of the designated object is accepted, the display of the designated object is maintained,
wherein the touch panel portion accepts the second operation as an instruction to paste the designated object, and accepts, as an input of determining pasting of the designated object, that the two fingers of the user have been taken off from the touch panel portion and the touched points have disappeared, and
the display portion pastes and displays the designated object on a screen being displayed when the input of determining pasting of the designated object is given.

* * * * *